United States Patent
Nakagawa et al.

(10) Patent No.: US 9,428,067 B2
(45) Date of Patent: Aug. 30, 2016

(54) VEHICLE RUNNING MANAGEMENT SYSTEM UNDER RENEWABLE ENERGY

(71) Applicant: HONDA MOTOR CO., LTD., Tokyo (JP)

(72) Inventors: Tomoaki Nakagawa, Sakura (JP); Takayuki Kato, Saitama (JP); Junya Noguchi, Utsunomiya (JP); Shinji Takuno, Utsunomiya (JP); Yusaku Amari, Saitama (JP); Atsushi Hirosawa, Utsunomiya (JP); Hiroyuki Abe, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 314 days.

(21) Appl. No.: 13/962,368

(22) Filed: Aug. 8, 2013

(65) Prior Publication Data

US 2014/0049216 A1 Feb. 20, 2014

(30) Foreign Application Priority Data

Aug. 15, 2012 (JP) .................... 2012-179982

(51) Int. Cl.
*H02J 7/00* (2006.01)
*B60L 11/18* (2006.01)

(52) U.S. Cl.
CPC ......... *B60L 11/1809* (2013.01); *B60L 11/1842* (2013.01); *B60L 2230/22* (2013.01); *B60L 2230/24* (2013.01); *Y02E 60/721* (2013.01); *Y02T 10/7005* (2013.01); *Y02T 10/7094* (2013.01); *Y02T 90/121* (2013.01); *Y02T 90/128* (2013.01); *Y02T 90/14* (2013.01); *Y02T 90/163* (2013.01); *Y04S 10/126* (2013.01)

(58) Field of Classification Search
CPC ............ B60L 11/1809; B60L 11/1842; B60L 2230/22; B60L 2230/24; Y02T 10/7005; Y02T 10/7094; Y02T 90/121; Y02T 90/128; Y02T 90/14; Y02T 90/163
See application file for complete search history.

(56) References Cited

U.S. PATENT DOCUMENTS

| 2009/0144149 A1 | 6/2009 | Sakakibara et al. |
| 2012/0075090 A1 | 3/2012 | Satake et al. |

(Continued)

FOREIGN PATENT DOCUMENTS

| DE | 102011109171 A1 | 2/2012 |
| JP | 2009-134450 A | 6/2009 |

(Continued)

OTHER PUBLICATIONS

German Office Action dated Sep. 19, 2014, issued in corresponding DE applicaiton No. 102013216090.9 with English translation (7 pages).

(Continued)

*Primary Examiner* — Nha Nguyen
(74) *Attorney, Agent, or Firm* — Westerman, Hattori, Daniels & Adrian, LLP

(57) ABSTRACT

A vehicle running management system under renewable energy includes an electrically driven vehicle having a battery ECU. The battery ECU manages a remaining amount of renewable energy in a vehicle-mounted electric storage device as it increases and decreases when renewable energy is charged into the vehicle-mounted electric storage device and renewable energy is discharged from the vehicle-mounted electric storage device.

16 Claims, 18 Drawing Sheets

(56) References Cited

U.S. PATENT DOCUMENTS

| | | | |
|---|---|---|---|
| 2012/0112754 A1* | 5/2012 | Kawai | 324/428 |
| 2012/0228933 A1 | 9/2012 | Shiokawa | |
| 2012/0249065 A1* | 10/2012 | Bissonette et al. | 320/109 |
| 2012/0280804 A1 | 11/2012 | Matsumoto et al. | |
| 2013/0013123 A1 | 1/2013 | Ozaki | |
| 2013/0096725 A1* | 4/2013 | Ishida et al. | 700/286 |

FOREIGN PATENT DOCUMENTS

| | | |
|---|---|---|
| JP | 2010-239704 A | 10/2010 |
| JP | 2011-83058 A | 4/2011 |
| JP | 2011-098693 A | 5/2011 |
| JP | 2012-23872 A | 2/2012 |
| JP | 2012-71637 A | 4/2012 |
| WO | 2012/020508 A1 | 2/2012 |
| WO | WO2012/002001 * | 2/2012 |

OTHER PUBLICATIONS

Rejection of the Applicaton dated Sep. 15, 2015, issued in counterpart Japanese Patent Application No. 2012-179982, w/English partial translation (6 pages).

Office Action dated May 24, 2016, issued in counterpart Japanese Patnet Application No. 2012-179982, with Partial English translation. (6 pages).

* cited by examiner

US 9,428,067 B2

VEHICLE RUNNING MANAGEMENT SYSTEM UNDER RENEWABLE ENERGY

CROSS-REFERENCE TO RELATED APPLICATION

This application is based upon and claims the benefit of priority from Japanese Patent Application No. 2012-179982 filed on Aug. 15, 2012, the contents of which are incorporated herein by reference.

BACKGROUND OF THE INVENTION

1. Field of the Invention

The present invention relates to a vehicle running management system under renewable energy applicable to an electrically driven vehicle having an electric storage device, which can be charged from an external electric charger. The electrically driven vehicle includes an electric vehicle (EV), a plug-in hybrid vehicle (PHEV), a plug-in fuel cell vehicle (PFCV), or the like.

In the following description, the term "energy" refers to electric power [W] and the term "amount of energy" refers to an amount of electric power [Wh].

2. Description of the Related Art

Heretofore, there has been proposed a residential energy management system including a control unit for controlling electric power of an external electric power system, a control unit for controlling a private electric generator installed in a house, a control unit for controlling a residential electric storage device installed in the house, a control unit for controlling a vehicle-mounted electric storage device installed in an electric vehicle, a control unit for controlling an in-house load installed in the house, and a common controller that is connected to all the control units. The common controller controls the various control units to manage the consumption and supply of energy in the house. For details, reference should be made to FIG. 1 of Japanese Laid-Open Patent Publication No. 2012-023872 (hereinafter referred to as "JP2012-023872A").

In the proposed residential energy management system, the common controller controls the controllers for the electric power of the external electric power system, the private electric generator, the residential electric storage device, the vehicle-mounted electric storage device, and the in-house load, for thereby managing the consumption and supply of energy in the house. Therefore, the consumption and supply of energy in the house can be managed in a consolidated fashion, and the various devices referred to above can be controlled by the common controller (see paragraph [0007] of JP2012-023872A).

SUMMARY OF THE INVENTION

Recently, much attention has been drawn to the impact of vehicles on the environment, as evidenced by regulations introduced at the national level concerning $CO_2$ emissions from running vehicles.

According to the related art disclosed in JP2012-023872A, the user can recognize from which place energy is supplied to which place. However, since top priority is placed on energy self-sufficiency in a house (see paragraph of JP2012-023872A) and excessive energy as it is generated is stored in the vehicle-mounted electric storage device, nothing is taken into account about the type of energy that is consumed by the electrically driven vehicle, i.e., whether the consumed energy is renewable energy or energy from the external electric power system. Therefore, the user is unable to realize the utilization of renewable energy on the electrically driven vehicle.

It is an object of the present invention to provide a vehicle running management system under renewable energy which is capable of clarifying the management of an amount of renewable energy in the relationship between an electrically driven vehicle and a charging site, thus allowing the user to realize the utilization of renewable energy on the electrically driven vehicle and hence promoting the utilization of renewable energy on the electrically driven vehicle.

According to the present invention, there is provided a vehicle running management system under renewable energy comprising a charging site, having an electric generator, which is supplied with renewable energy from the electric generator and system energy from a system energy source, a charging site manager for managing an amount of renewable energy in the charging site, an electrically driven vehicle having a vehicle-mounted electric storage device which is charged with renewable energy and system energy that are sent from the charging site when the vehicle-mounted electric storage device is electrically connected to the charging site, and a vehicle manager for managing an amount of renewable energy stored in the vehicle-mounted electric storage device of the electrically driven vehicle, wherein the vehicle manager manages a remaining amount of renewable energy stored in the vehicle-mounted electric storage device as the remaining amount increases and decreases when renewable energy is charged into the vehicle-mounted electric storage device and renewable energy is discharged from the vehicle-mounted electric storage device.

The vehicle manager manages a remaining amount of renewable energy stored in the vehicle-mounted electric storage device as it increases and decreases when renewable energy is charged into the vehicle-mounted electric storage device and renewable energy is discharged from the vehicle-mounted electric storage device. The charged and discharged amount of renewable energy in the electrically driven vehicle can thus be managed, and the management of the amount of renewable energy is clarified in the relationship between the electrically driven vehicle and the charging site.

The vehicle manager may be present in the electrically driven vehicle, or may be present in a server which is located outside of the electrically driven vehicle and is connected thereto through a communication link for synchronously managing data, or may be present in the charging site which is connected to the server through a communication link for synchronously managing data. Similarly, the charging site manager may be present in the charging site, or may be present in the server which is connected to the charging site through a communication link for synchronously managing data, or may be present in the electrically driven vehicle which is connected to the server through a communication link for synchronously managing data.

The charging site may include a virtual electric storage device, and the charging site manager may store renewable energy generated by the electric generator in the virtual electric storage device when the electrically driven vehicle is not charged. Therefore, even if the charging site is free of the stationary electric storage device or when the electrically driven vehicle is running during the daytime and cannot be charged with renewable energy from the electric generator, the electrically driven vehicle can subsequently be charged at the charging site as if with renewable energy from the virtual electric storage device.

Specifically, if the charging site is free of the stationary electric storage device, then renewable energy generated by the electric generator is consumed by the charging site, and a pseudo-amount of renewable energy which is commensurate with the consumed amount of renewable energy is virtually stored in the virtual electric storage device of the charging site. When the electrically driven vehicle is to be charged with the pseudo-amount of renewable energy stored in the virtual electric storage device, the electrically driven vehicle is actually charged with an amount of system energy which corresponds to the pseudo-amount of renewable energy stored in the virtual electric storage device. The amount of system energy can thus be managed as the used amount of renewable energy.

When the charging site manager transmits electric energy from the charging site to the electrically driven vehicle, the charging site manager may also transmit a renewable energy ratio representing a proportion of renewable energy in the transmitted electric energy, and the vehicle manager may measure a total received amount of electric energy, and multiply the measured total received amount of electric energy by the renewable energy ratio, thereby calculating an increase in the renewable energy that is stored in the vehicle-mounted electric storage device. Consequently, even if the amount of transmitted electric energy which is measured at a transmission side and the amount of received electric energy which is measured at a reception site do not agree with each other, the reception side can reasonably calculate an increase in the renewable energy. Actually, since each of the transmission side, the reception side, and the transmission path therebetween causes a loss, the amount of transmitted electric energy and the amount of received electric energy do not agree with each other.

The vehicle manager may calculate a loss as a difference between a total discharged amount representing a total transmitted amount of electric energy, which includes renewable energy and system energy measured at the charging site, and a total charged amount in the vehicle-mounted electric storage device which is measured by the vehicle manager. If the loss is smaller than the amount of system energy transmitted from the charging site, then the vehicle manager may manage the loss entirely as an amount of system energy, and if the loss is greater than the amount of system energy transmitted from the charging site, then the vehicle manager may cover the loss with the amount of system energy and manage a shortage of the amount of system energy as the amount of renewable energy.

The vehicle manager may be capable of selecting whether electric energy required to drive the electrically driven vehicle should be renewable energy or system energy. When regenerated electric energy is charged into the vehicle-mounted electric storage device while the electrically driven vehicle is running, the vehicle manager may manage an increase in the electric energy which is caused by the regenerated electric energy as an increase in renewable energy, so that the user can realize that renewable energy is used on the electrically driven vehicle.

The vehicle manager may be capable of selecting whether electric energy required to drive the electrically driven vehicle should be renewable energy or system energy. When regenerated electric energy is charged into the vehicle-mounted electric storage device while the electrically driven vehicle is running, if renewable energy is selected to drive the electrically driven vehicle, then the vehicle manager may manage an energy rise caused by the regenerated electric energy as an increase in renewable energy, and if system energy is selected to drive the electrically driven vehicle, then the vehicle manager manages an energy rise caused by the regenerated electric energy as an increase in system energy, so that the user can realize that renewable energy is used on the electrically driven vehicle.

The vehicle manager may give a user of the electrically driven vehicle an incentive based on running of the electrically driven vehicle using renewable energy as a propulsive energy source, so that the running of the electrically driven vehicle using renewable energy can be promoted.

The electrically driven vehicle may include a display unit, and the vehicle manager may display on the display unit a visualized physical quantity representing the running of the electrically driven vehicle using renewable energy as a propulsive energy source. Therefore, the use of renewable energy is visible to make the user realize better that renewable energy is used on the electrically driven vehicle.

The electrically driven vehicle may include a display unit, and the vehicle manager may display on the display unit a remaining amount of renewable energy stored in the vehicle-mounted electric storage device. Therefore, the use of renewable energy is visible to make the user realize better that renewable energy is used on the electrically driven vehicle.

The incentives may be given by the national government or the local governments or their representatives to achieve a higher possibility to contribute to a reduction in the $CO_2$ emissions at the national level.

According to the present invention, since the vehicle manager manages a remaining amount of renewable energy stored in the vehicle-mounted electric storage device as it increases and decreases when renewable energy is charged into the vehicle-mounted electric storage device and renewable energy is discharged from the vehicle-mounted electric storage device. The charged and discharged amount of renewable energy in the electrically driven vehicle can thus be managed, and the management of the amount of renewable energy is clarified in the relationship between the electrically driven vehicle and the charging site.

As a result, the user can realize the use of renewable energy by the electrically driven vehicle, and the running of the electrically driven vehicle using renewable energy is promoted.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Vehicles running management systems under renewable energy according to preferred embodiments of the present invention will be described below with reference to the drawings.

Figure 1:
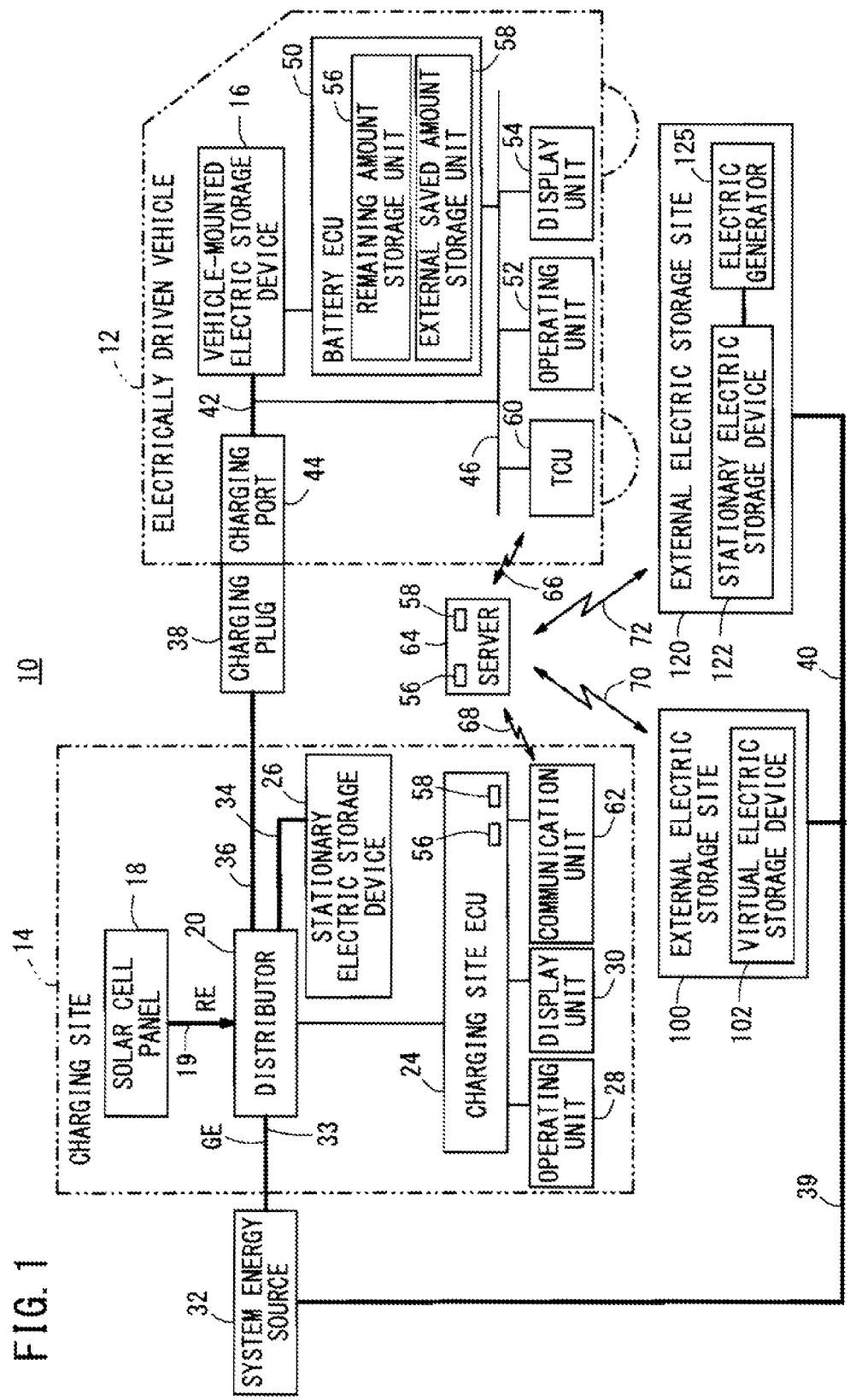
FIG. 1 is a schematic block diagram of a vehicle running management system under renewable energy according to an embodiment of the present invention.

FIG. 1 shows in schematic block form a vehicle running management system 10 under renewable energy according to an embodiment of the present invention.

As shown in FIG. 1, the vehicle running management system 10 basically comprises an electrically driven vehicle 12 (hereinafter also referred to simply as "vehicle 12") of the user which incorporates a vehicle-mounted electric storage device 16, and a charging site 14 such as the house of the user. If necessary, the vehicle running management system 10 may also include external electric storage sites 100, 120 for saving renewable energy (hereinafter referred to as "renewable energy RE" or "RE") that has been discharged from the vehicle-mounted electric storage device 16.

Figure 2:
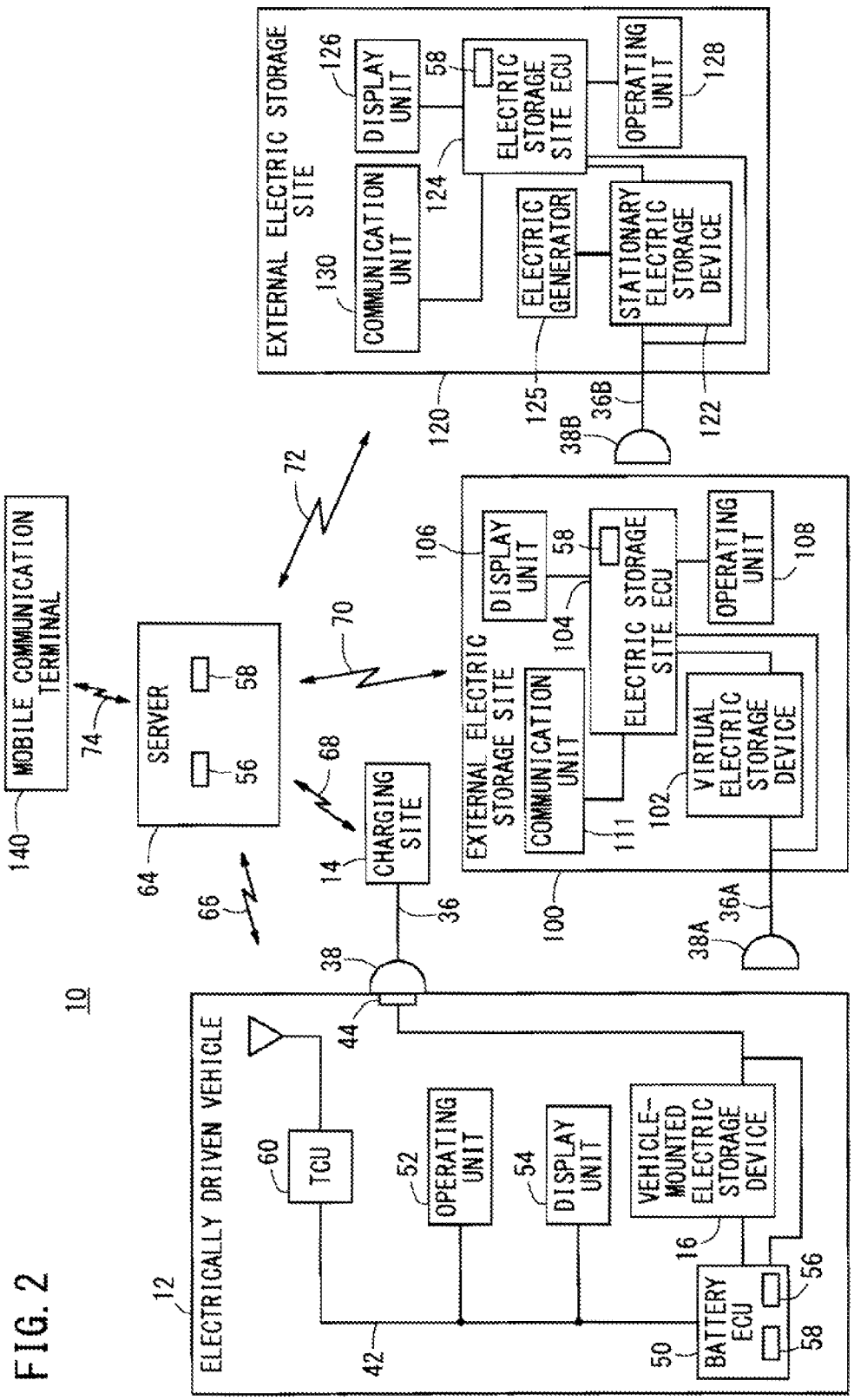
FIG. 2 is a schematic block diagram of the vehicle running management system with external electric storage sites illustrated in detail.

FIG. 2 shows in schematic block form the vehicle running management system 10 with the external electric storage sites 100, 120 illustrated in detail.

As shown in FIG. 2, the external electric storage site 100 includes a virtual electric storage device 102. The virtual electric storage device 102, which is not a real electric storage device such as the vehicle-mounted electric storage device 16 or a stationary electric storage device 122 of the external electric storage site 120, virtually stores an amount of renewable energy which has been sent from the vehicle-mounted electric storage device 16 of the electrically driven vehicle 12 and consumed by the external electric storage site 100, as a pseudo-amount of renewable energy in association with the ID (identification code) of the vehicle 12 or the user of the vehicle 12.

In other words, the external electric storage site 100 recognizes the vehicle 12 or the user of the vehicle 12 and manages the amount of renewable energy virtually saved in the virtual electric storage device 102 in association with the ID (identification code) of the vehicle 12 or the user of the vehicle 12.

When the vehicle 12 is charged with the pseudo-amount of renewable energy which has been virtually stored (saved) in the virtual electric storage device 102 and associated with its own ID, i.e., managed with its own ID, the vehicle 12 is actually charged with an amount of system energy (or commercial energy, hereinafter referred to as "system energy GE" or "GE") from a system energy source such as an electric power company, which is commensurate with the pseudo-amount of renewable energy stored (saved) in the virtual electric storage device 102. The amount of system energy that is used is managed as the amount of renewable energy that is used.

Saving renewable energy means for the vehicle 12 to deposit renewable energy associated with its own ID in the external electric storage sites 100, 120 and to keep renewable energy associated with its own ID deposited in the external electric storage sites 100, 120. Recharging the vehicle-mounted electric storage device 16 of the vehicle 12 with renewable energy saved in the external electric storage sites 100, 120 is referred to as "withdrawal charging".

The external electric storage site 120, which includes the stationary electric storage device 122, has a generating device 125 such as a solar cell panel or the like for generating renewable energy, i.e., a RE generating device 125. The stationary electric storage device 122 stores and manages an amount of renewable energy associated with the user's ID and an amount of renewable energy generated by the RE generating device 125. The stationary electric storage device 122 may also store (save) renewable energy RE discharged from the vehicle-mounted electric storage device 16 of the vehicle 12.

If the amount of renewable energy to be charged in the stationary electric storage device 122 is likely to exceed the storage capacity of the stationary electric storage device 122, then the excessive amount of renewable energy may be consumed by the external electric storage site 120 and the consumed amount of renewable energy may be assumed to be stored in a virtual electric storage device, not shown. This process is also applicable to a stationary electric storage device 26 of the charging site 14.

Figure 3:
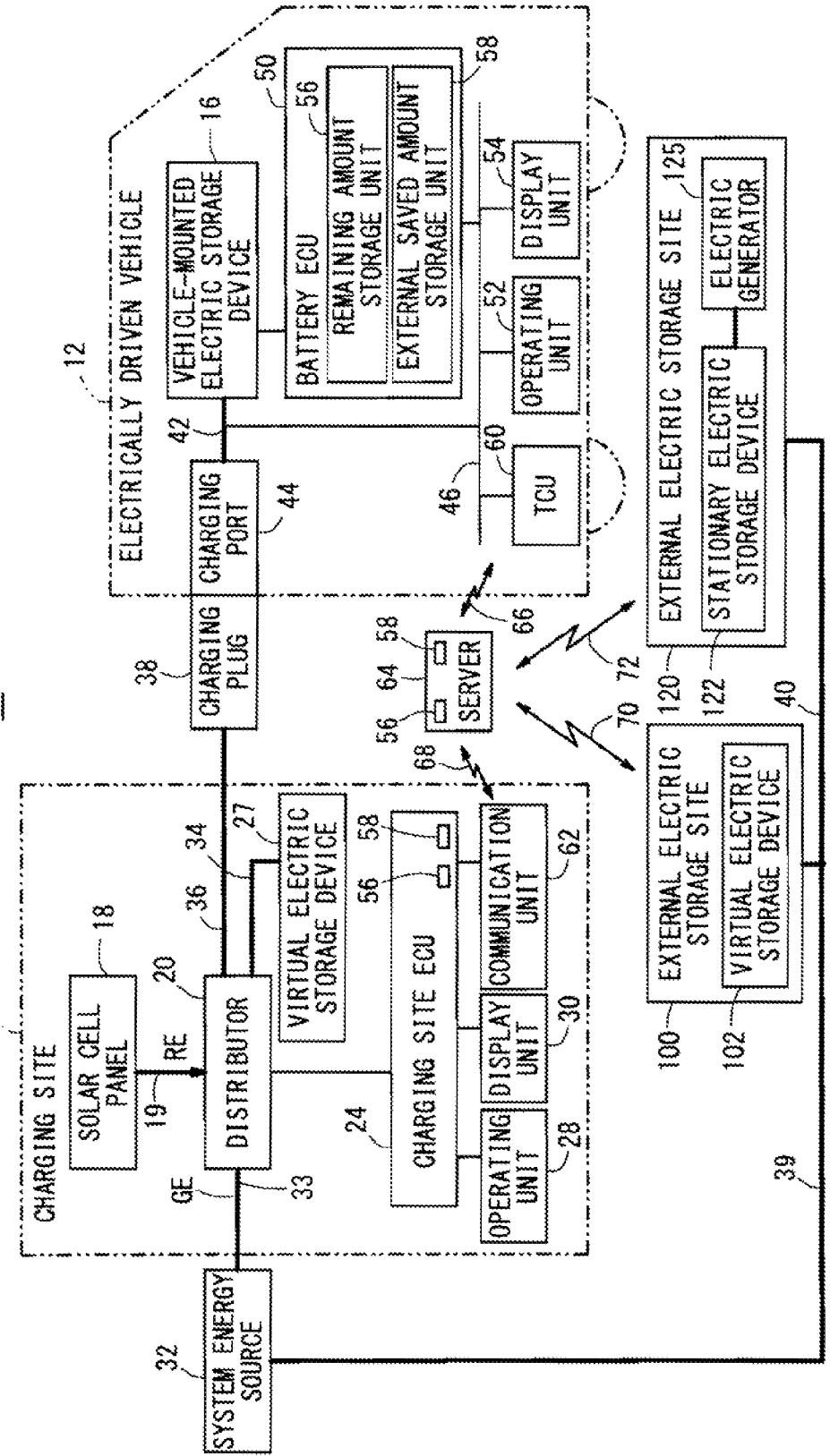
FIG. 3 is a schematic block diagram of a vehicle running management system under renewable energy according to a modification of the embodiment.

Since the stationary electric storage device 26 is highly costly, it may be replaced with a virtual electric storage device 27 as shown in FIG. 3. If the stationary electric storage device 26 is replaced with the virtual electric storage device 27, then while the electrically driven vehicle 12 is going out during the daytime, renewable energy RE generated by a solar cell panel 18 may be consumed by the charging site 14, and the consumed amount of renewable energy RE may be assumed to be stored in the virtual electric storage device 27.

The external electric storage sites 100, 120 may be installed in shops such as convenience stores, malls, etc., public buildings such as city offices, civic halls, etc., or medical and welfare facilities such as hospitals, etc. If the external electric storage sites 100, 120 are installed in shops, then the user is expected to go to the shops and use the external electric storage sites 100, 120 to charge the vehicle 12 with renewable energy RE (withdrawal charging) and discharge (save) renewable energy RE. Therefore, the shops with the external electric storage sites 100, 120 tend to attract more customers, and as a result to increase their sales. If the external electric storage sites 100, 120 are installed in public buildings or medical and welfare facilities, then the public buildings or medical and welfare facilities become more user friendly and their use will possibly be promoted.

The electrically driven vehicle 12 according to the present embodiment comprises an electric vehicle (EV), which uses electric energy as an energy source and an electric motor as a power source. However, the electrically driven vehicle 12 is not limited to an electric vehicle, but may be a vehicle having a vehicle-mounted electric storage device 16 such as a battery (secondary cells) that can be charged by an external electric charger including the charging site 14 or the like, such as a plug-in hybrid vehicle (PHEV), a plug-in fuel cell vehicle (PFCV), or the like.

According to the present invention, the vehicle-mounted electric storage device 16 comprises a battery. However, the vehicle-mounted electric storage device 16 may alternatively comprise a capacitor that can be charged and discharged.

The charging site 14 includes a solar cell panel 18, which serves as an electric generator for generating renewable energy RE, and a distributor 20 for distributing renewable energy RE supplied from the solar cell panel 18 through a cable 19. The renewable energy RE may be energy generated by solar power generation or energy with low $CO_2$ emission typified by wind power generation, geothermal power generation, etc.

The charging site 14 also includes a charging site ECU 24, which serves as a charging site manager (charging site controller) and is connected to the distributor 20. The charging site ECU 24 is connected to an operating unit 28, a display unit 30, and a communication unit 62.

The distributor 20 of the charging site 14 is supplied with system energy from a system energy source 32 such as an electric power company or the like through a cable 33. The system energy is also supplied through cables 39, 40 to the external electric storage sites 100, 120.

The distributor 20 is connected to the stationary electric storage device 26 and/or the virtual electric storage device 27 (FIG. 3) through a cable 34, and to a charging plug 38 through a cable 36.

Each of the cables 19, 33, 34, 36, 39, 40 comprises power lines and control lines.

In the electrically driven vehicle 12, the vehicle-mounted electric storage device 16 is connected through a cable 42 to a charging port 44 having a lid. The charging plug 38, which is connected to the cable 36 of the charging site 14, is detachably connected to the charging port 44 of the electrically driven vehicle 12.

The electrically driven vehicle 12 has a communication line 46 such as a CAN (Controller Area Network) or the like. A battery ECU 50, which serves as a vehicle manager (vehicle controller) according to the present embodiment, is connected through the communication line 46 to an operating unit 52, a display unit 54, and a TCU (Telematics Control Unit) 60 (communication controller, telematics device) as a communication unit. The vehicle-mounted electric storage device 16 also is connected to the battery ECU 50.

The operating unit 52 and the display unit 54 may be provided as dedicated units. However, the operating unit 52 and the display unit 54 may be replaced with a vehicle-mounted navigation device, which has an operating unit and a display unit, or a touch-panel multi-information display device.

As shown in FIG. 2, the external electric storage sites 100, 120 include respective electric storage site ECUs 104, 124 as charging managers.

The external electric storage sites 100, 120 also include respective display units 106, 126, respective operating units 108, 128, respective communication units 111, 130, and a virtual electric storage device 102 and a stationary electric storage device 122, respectively, which are connected to the electric storage site ECUs 104, 124, respectively. Charging plugs 38A, 38B are connected respectively to the electric storage site ECUs 104, 124 by respective cables 36A, 36B.

In FIG. 2, a mobile communication terminal 140 belongs to the user of the electrically drive vehicle 12, and is connected to a server 64 through a mobile communication link 74. According to the present embodiment, the mobile communication terminal 140 comprises a smart phone having a data communication function and a telephone function. However, the mobile communication terminal 140 is not limited to a smart phone, but may be a cellular phone, a tablet terminal, or a mobile PC (personal computer), or the like.

Each of the charging site ECU 24, the battery ECU 50, and the electric storage site ECUs 104, 124 comprises a computer including a microcomputer, and has a CPU (central processing unit), a memory including a ROM (read only memory) (including an EEPROM) and a RAM (random access memory), input/output devices such as an A/D converter and a D/A converter, and a timer that serves as a time measuring unit. The CPU reads and executes programs stored in the ROM to act as various function realizing sections (function realizing means), e.g., a controller, an arithmetic unit, and a processor.

The charging site ECU 24 of the charging site 14, the server 64, and the battery ECU 50 of the electrically driven vehicle 12 are connected to each other through a communication link 68, e.g., a public communication network, and a communication link 66, e.g., a mobile communication network.

The server 64 performs an authentication process for facilitating mutual communications between the charging site ECU 24 and the battery ECU 50. The server 64 is connected to the external electric storage sites 100, 120 through respective communication links 70, 72, e.g., a public communication network.

The server 64 is able to obtain synchronous data representing remaining amounts of renewable energy available to the user which are stored respectively in the charging site 14, the electrically driven vehicle 12, and the external electric storage sites 100, 120.

According to the present embodiment, the remaining amount of renewable energy in the vehicle-mounted electric storage device 16 is stored in a remaining amount storage unit 56 of the battery ECU 50, and also synchronously stored in remaining amount storage units 56 of the server 64 and the charging site 14.

The remaining amount of renewable energy that is stored in each of the remaining amount storage units 56 may be in the form of a remaining amount SOC (State Of Charge) representing the sum of renewable energy and system energy, and a renewable energy ratio Rre representing the proportion of renewable energy in the remaining amount SOC.

The saved amount of renewable energy that is saved in the external electric storage sites 100, 120 by the electrically driven vehicle 12 is stored in an external saved amount storage unit 58 of the battery ECU 50, and also synchronously stored in external saved amount storage units 58 of the server 64 and the charging site 14.

Figure 4:
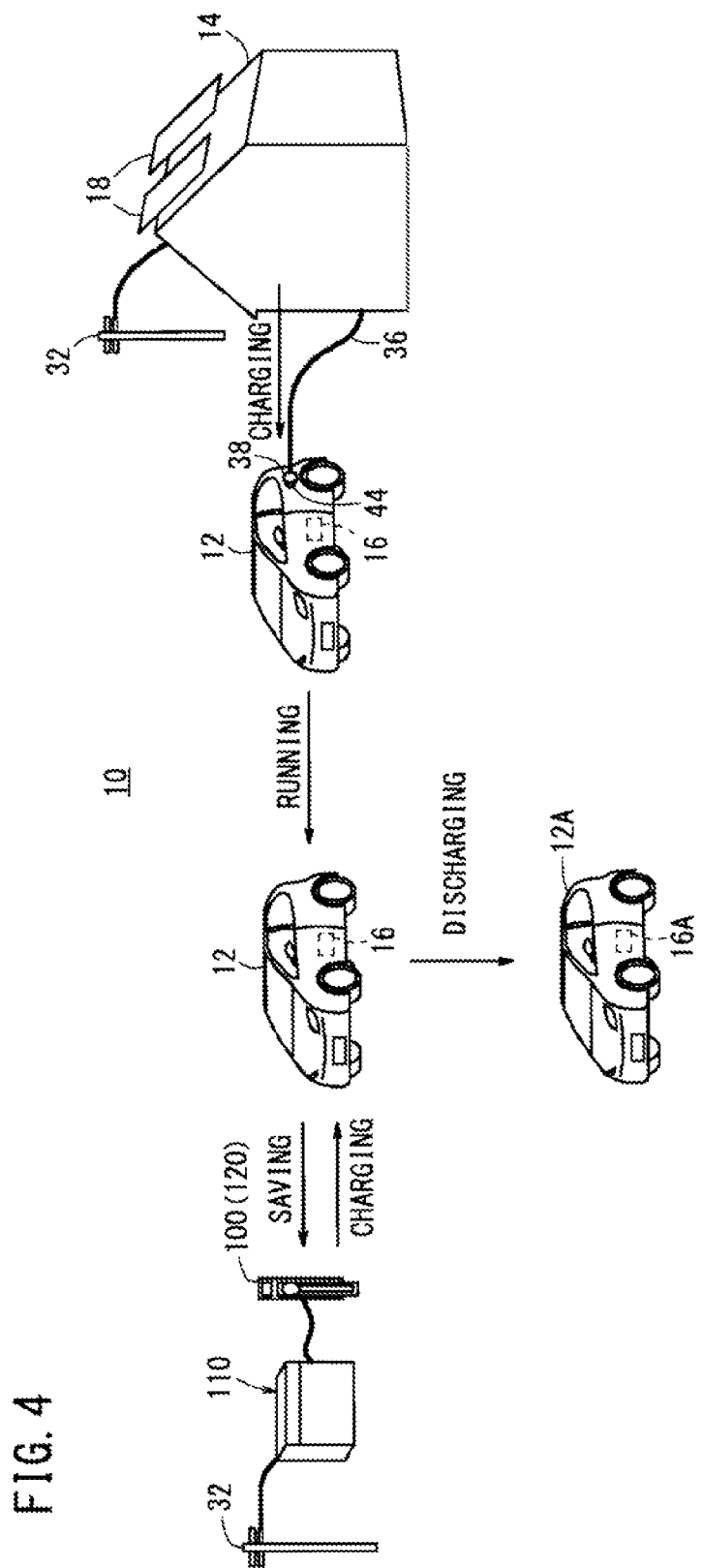
FIG. 4 is a schematic view showing the manner in which the vehicle running management system is in operation.

FIG. 4 schematically shows the manner in which the vehicle running management system 10 is in operation.

As shown in FIG. 4, the vehicle 12 has its vehicle-mounted electric storage device 16 basically charged with renewable energy RE in the charging site 14. The vehicle 12, with the vehicle-mounted electric storage device 16 charged with renewable energy RE, travels to the external electric storage site 100 or 120 that is combined with facilities 110 such as a shop, a city office, or the like referred to above. In the external electric storage site 100 (120), the vehicle 12 discharges the renewable energy RE from the vehicle-mounted electric storage device 16 and saves the discharged renewable energy RE as actual energy in the stationary electric storage device 122. Alternatively, in the external electric storage site 100, vehicle 12 discharges the renewable energy RE from the vehicle-mounted electric storage device 16, and the discharged renewable energy RE is actually consumed in the facilities 110 in real time, while at the same time the vehicle 12 saves virtual renewable energy RE which is commensurate with the consumed renewable energy RE virtually in the virtual electric storage device 102. Subsequently when necessary, the vehicle 12 has its vehicle-mounted electric storage device 16 charged with the renewable energy RE of its own that has been saved in the stationary electric storage device 122 or the virtual electric storage device 102.

The vehicle 12 may also charge a vehicle-mounted electric storage device 16A on another electrically driven vehicle 12A with renewable energy RE.

While the vehicle 12 is running in a power mode, it discharges the renewable energy RE stored in the vehicle-mounted electric storage device 16. While the vehicle 12 is running in a regenerative mode, it charges the vehicle-mounted electric storage device 16 with regenerated electric energy.

Operation of the vehicle running management system 10 which is basically of the above configuration will be described below with respect to various different aspects of energy management in the following sequence for an easier understanding of the present invention.

I. Management of Renewable Energy RE on Vehicle 12
II. Management of Consumption of Different Types of Energy during Running of Vehicle 12
III. Management of Renewable Energy RE in charging Site 14
IV. Example of Management of Renewable Energy RE Based on Timing Chart
V. Full Management of Renewable Energy RE Based on Flowcharts

[I. Management of Renewable Energy RE on Vehicle 12]

Since the vehicle 12 has the vehicle-mounted electric storage device 16, it can manage the retained amount of renewable energy RE in terms of actual energy.

Specifically, when the charging plug 38 of the charging site 14 is inserted into the charging port 44 of the vehicle 12 and renewable energy RE is charged from the charging site 14 into the vehicle-mounted electric storage device 16, the battery ECU 50 measures a total amount Tin of charged electric energy with a measuring instrument (power meter), and acquires a renewable energy ratio Rout sent from the charging site ECU 24 of the charging site 14. The battery ECU 50 calculates an amount REwh of renewable energy charged in the vehicle-mounted electric storage device 16 according to the equation (1) shown below. An amount GEwh of system energy that is charged in the vehicle-mounted electric storage device 16 at this time is calculated according to the equation (2) shown below.

$$REwh = Tin \times Rout \quad (1)$$

$$GEwh = Tin \times (1 - Rout) \quad (2)$$

A total amount Tout of transmitted energy that is measured in the charging site 14, which is a transmitting side, and the total amount Tin of charged energy that is measured in the vehicle 12, which is a receiving side, are not in agreement with each other because of a loss which the energy suffers when sent from the charging site 14 to the vehicle 12. Thus, the vehicle 12 on the receiving side cannot calculate a correct amount of REwh of the renewable energy. The charging site 14 supplies the battery ECU 50 of the vehicle 12 with the renewable energy ratio Rout (renewable energy ratio of the total amount of transmitted energy) that represents the proportion of the amount of renewable energy in the total amount Tout of transmitted energy. Using the renewable energy ratio Rout thus supplied, the battery ECU 50 can calculate the charged amount REwh of renewable energy according to the equation (1).

At the end of the charging process, the remaining amount SOC in the remaining amount storage unit 56 and a renewable energy ratio Rre are calculated according to the equations (3), (4) shown below. It is assumed that the remaining amount SOC prior to the charging process is represented by SOCb and the remaining amount SOC subsequent to the charging process by SOCa. It is also assumed that the renewable energy ratio Rre prior to the charging process is represented by Rreb and the renewable energy ratio Rre subsequent to the charging process by Rrea.

$$SOCa = SOCb + Tin \quad (3)$$

$$Rrea = (SOCb \times Rreb + Tin \times Rout)/SOCa \quad (4)$$

While the vehicle 12 is running, since the vehicle-mounted electric storage device 16 is retaining both renewable energy RE and system energy GE, the user selects which one of renewable energy RE and system energy GE is used to drive the vehicle 12. According to defaults (initial settings), the vehicle 12 initially consumes renewable energy RE. The user can select renewable energy RE or system energy GE and change the settings on the operating unit 52 and the display unit 54.

Inasmuch as the vehicle-mounted electric storage device 16 consumes its stored energy due to its deterioration and a dark current over time, the amount REwh of renewable energy can be managed more accurately with the renewable energy ratio Rre of the remaining amount SOC which represents the total amount of energy retained by the vehicle-mounted electric storage device 16, i.e., the renewable energy ratio Rrea of the total amount of energy retained by the vehicle-mounted electric storage device 16, than with the absolute amount of energy. The remaining amount storage unit 56 of the battery ECU 50 stores the renewable energy ratio Rre as well as the remaining amount SOC.

A consumed amount REwh of renewable energy RE (amount of renewable energy) that is consumed by the vehicle 12 is calculated according to the following equation (5):

$$REwh = Tout \times Rre \quad (5)$$

where Tout represents the total amount of discharged energy measured by the measuring instrument.

[II. Management of Consumption of Different Types of Energy during Running of Vehicle 12]

Figure 5:
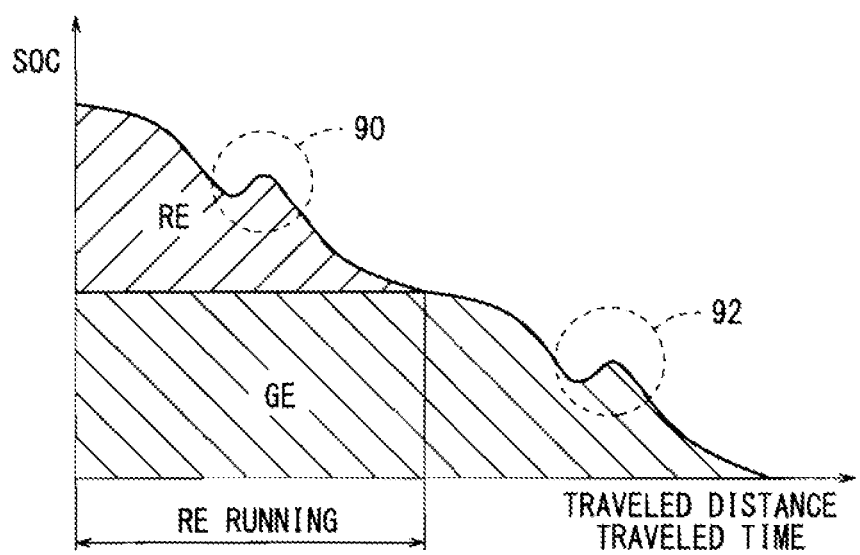
FIG. 5 is a graph showing an example of how different types of energy are consumed when an electrically driven vehicle is running.

FIG. 5 is a graph showing an example of how different types of energy are consumed when the electrically driven vehicle 12 is running. The graph shown in FIG. 5 has a horizontal axis representing the distance or time that the vehicle 12 has traveled, and a vertical axis representing the remaining amount SOC of the vehicle-mounted electric storage device 16. The remaining amount SOC is often expressed by %.

The vehicle 12 starts running by consuming renewable energy RE. After having run for a predetermined distance or time, the vehicle 12 runs out of renewable energy RE, and then continues to run by consuming system energy GE. The display unit 54 displays the remaining amount SOC under the control of the battery ECU 50, while the renewable energy RE and the system energy GE are shown distinguishably from each other.

A remaining amount SOCre of renewable energy RE is calculated as SOC×Rre, and a remaining amount SOCge of system energy GE as SOC×(1−Rre).

In FIG. 5, energy rises 90, 92 are caused by regenerative electric power produced by the electric motor which is mounted as a power source on the vehicle 12. The energy rises 90, 92 that are caused by regenerative electric power increase the energy that was consumed before the regenerative electric power is produced.

The energy rise 90 is counted as an increase in renewable energy, whereas the energy rise 92 as an increase in system energy.

Figure 6:
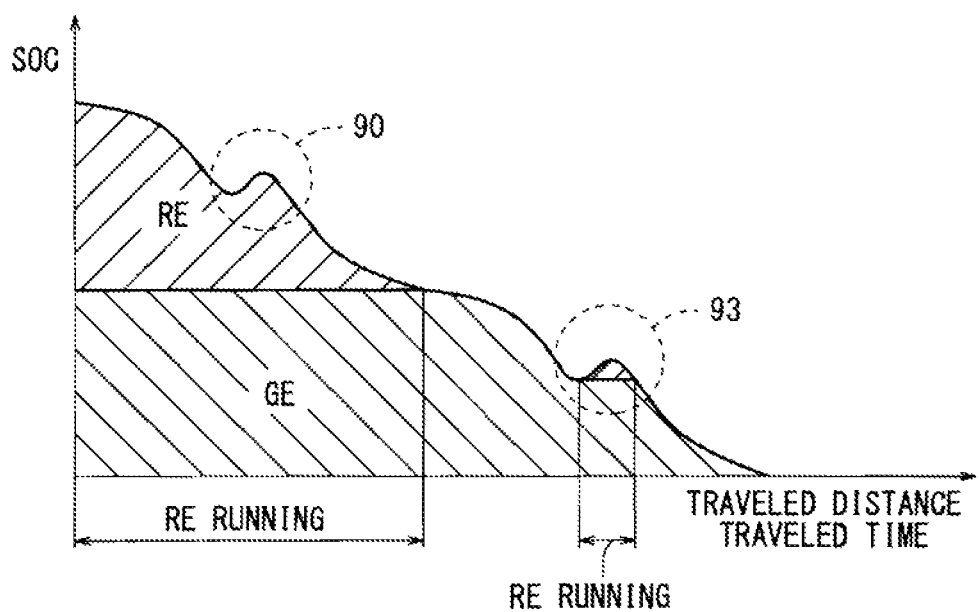
FIG. 6 is a graph showing another example of how different types of energy are consumed when an electrically driven vehicle is running.

Alternatively, as shown in FIG. 6, energy rises 90, 93 that are caused by regenerative electric power may all be counted as increases in renewable energy.

Figure 7:
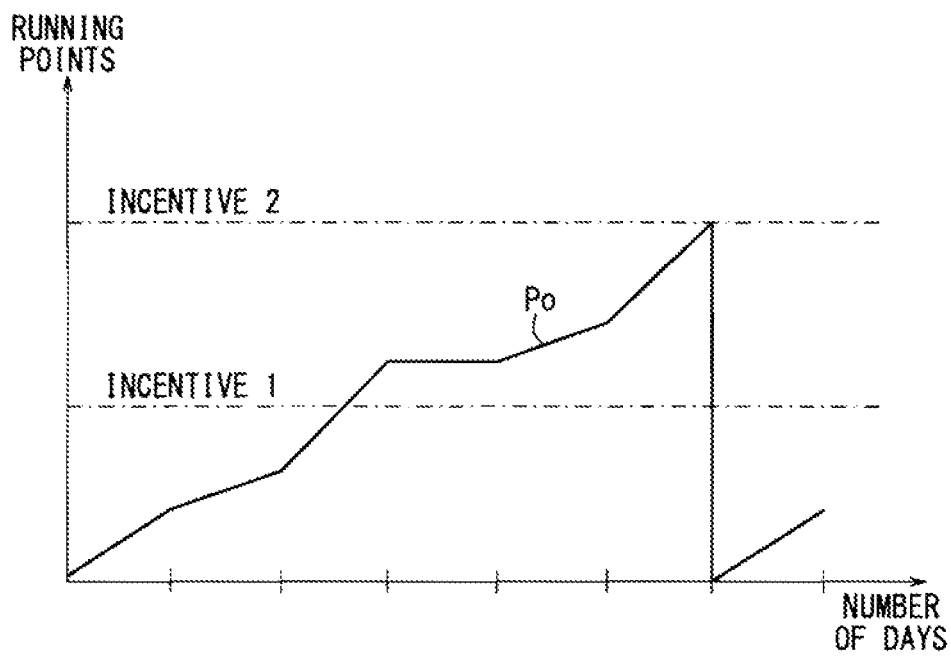
FIG. 7 is a graph showing an example in which incentives are given to the running of the electrically driven vehicle under renewable energy.

FIG. 7 shows a daily incremental curve of running points Po that are given to traveled distances under renewable energy, traveled periods of time under renewable energy, or amounts of renewable energy consumed to travel, in order to make the user feel like traveling more under renewable energy and reducing environmental burdens, in addition to incentives 1, 2 such as tax reductions, subsidies (both public and private) for the purchase of vehicles, discounts, and commodity gifts which are given for the running under renewable energy RE. In FIG. 7, the points Po fall to zero when the user uses the incentive 2 on a certain day.

[III. Management of Renewable Energy RE in Charging Site 14]

Renewable energy RE generated by the solar cell panel 18 cannot be stored in the charging site 14 unless the stationary electric storage device 26 is included in the charging site 14. Since the external electric storage site 100 is free of the stationary electric storage device 122, it cannot store renewable energy RE as real energy even if it receives renewable energy RE from the vehicle 12.

At present, the stationary electric storage devices 26, 122 are highly costly to install and hence present an obstacle to the widespread use of vehicles operable under renewable energy RE. According to the present embodiment, the virtual electric storage devices 27, 102 are incorporated to hold a pseudo-amount of renewable energy RE virtually.

When the charging site 14 shown in FIG. 3, which is free of the stationary electric storage device 26 and has the virtual electric storage device 27, consumes renewable energy RE generated by the solar cell panel 18 during a certain period, with its own load, the charging site ECU 24 calculates the consumed amount of renewable energy RE and stores (memorizes) the calculated amount of renewable energy RE as a pseudo-amount of renewable energy RE in the virtual electric storage device 27. When the charging site 14 then charges the vehicle 12, the charging site ECU 24 subtracts the charged amount of electric energy from the pseudo-amount of renewable energy RE stored (memorized) in the virtual electric storage device 27. The pseudo-amount of renewable energy RE retained or memorized in the virtual electric storage device 27 of the charging site 14 shown in FIG. 3 can be managed according to one of the three equations (i), (ii), and (iii) shown below. The amount of renewable energy RE retained or memorized in the stationary electric storage device 26 of the charging site 14 shown in FIG. 1 can be managed according to the equation (iv) shown below.

Retained amount of renewable energy=generated amount of electric energy−amount of reverse-flow electric energy; (i)

Retained amount of renewable energy=generated amount of electric energy−amount of electric energy consumed in the charging site; (ii)

Retained amount of renewable energy=generated amount of electric energy (iii)

Retained amount of renewable energy=generated amount of electric energy−amount of reverse-flow electric energy−amount of electric energy consumed in the charging site. (iv)

In the equations (i) through (iv), the right sides represent absolute values. If the retained amount of renewable energy on the left sides is of a negative value, it is set to zero.

The equation (iv) applies to the charging site 14 having the stationary electric storage device 26 shown in FIG. 1. Renewable energy is actually stored in the stationary electric storage device 26, and the amount of electric energy retained or stored in the stationary electric storage device 26 is referred to as a retained amount of renewable energy RE. In the equation (iv), the amount of reverse-flow electric energy is subtracted because the charging site 14 is making a profit.

When the charging site 14 charges the vehicle 12, the total amount Tout of transmitted energy referred to above is subtracted from the retained amount of renewable energy according to the equations (i) through (iv).

If the retained amount of renewable energy according to the equations (i) through (iv) is greater than the total amount Tin of electric energy charged into the vehicle 12 in a present cycle, then the total amount Tin of charged electric energy is entirely regarded as an amount of renewable energy {Rout=1(100 [%])}. If the total amount Tin of electric energy charged into the vehicle 12 is greater than the retained amount of renewable energy, then the shortage of the retained amount of renewable energy is regarded as an amount of system energy (Rout=retained amount of renewable energy RE/Tin).

Management of shifting of renewable energy will be described below with reference to FIGS. 8, 9, and 10.

Figure 8:
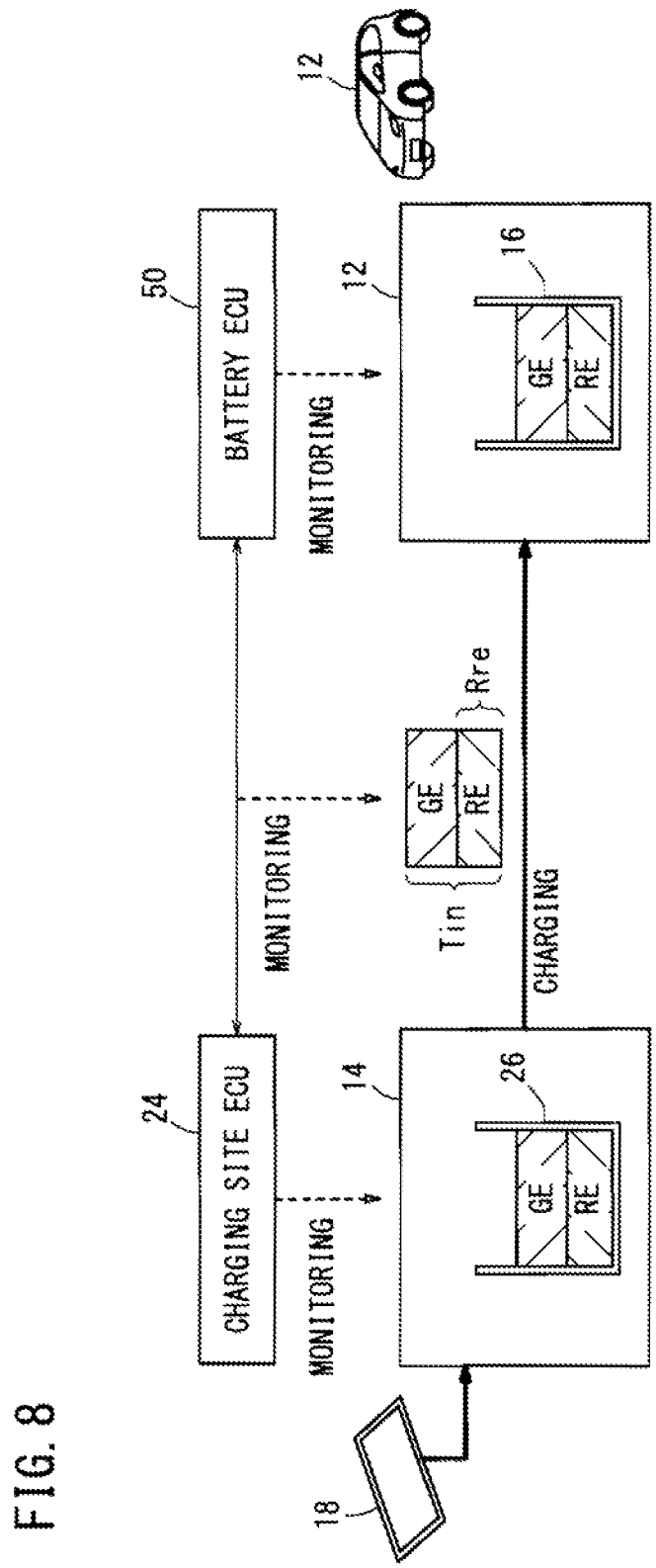
FIG. 8 is a diagram showing the management of a remaining amount of renewable energy at the time the electrically driven vehicle is charged with renewable energy at a charging site.

FIG. 8 is a diagram showing the management of a remaining amount of renewable energy at the time the vehicle 12 is charged with renewable energy RE at the charging site 14.

Figure 9:
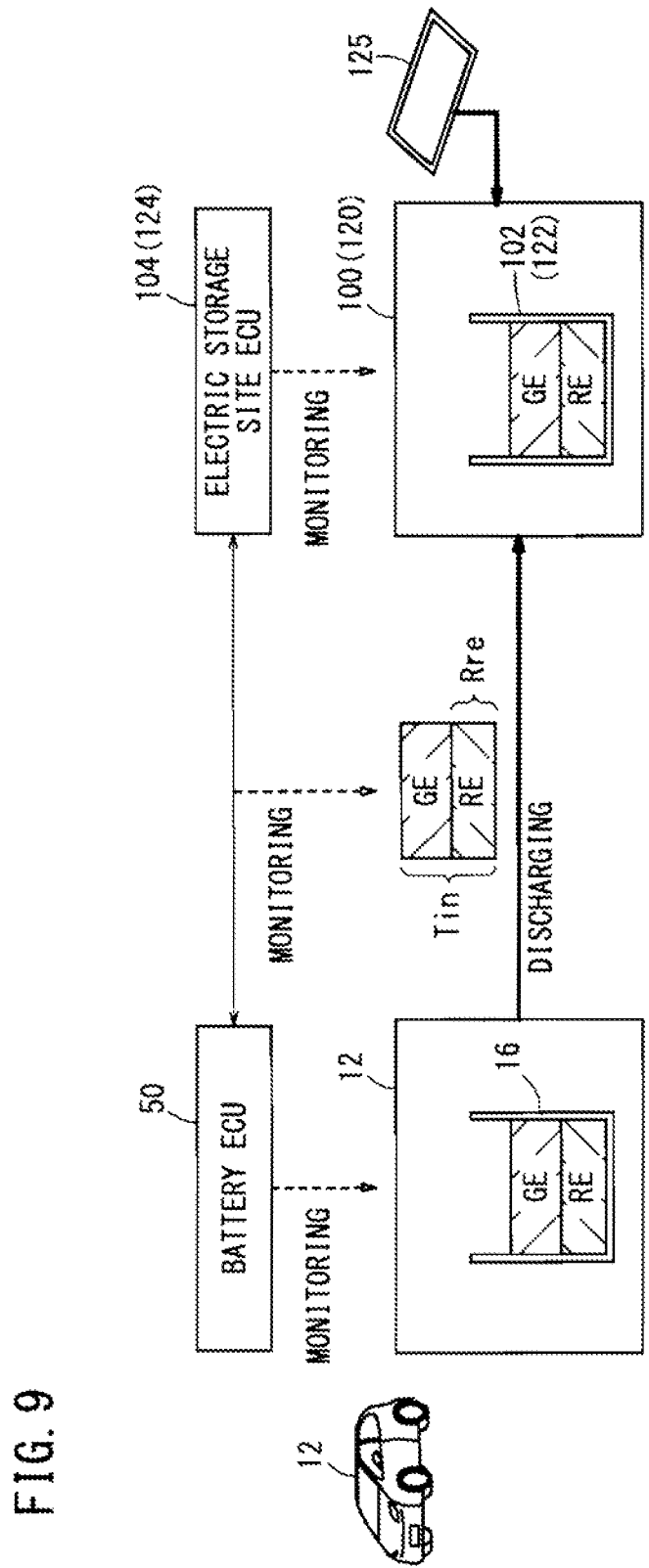
FIG. 9 is a diagram showing the management of a remaining amount of renewable energy at the time the electrically driven vehicle saves renewable energy at an external electric storage site.

FIG. 9 is a diagram showing the management of a remaining amount of renewable energy at the time the vehicle 12 saves renewable energy RE at the external electric storage sites 100, 120.

Figure 10:
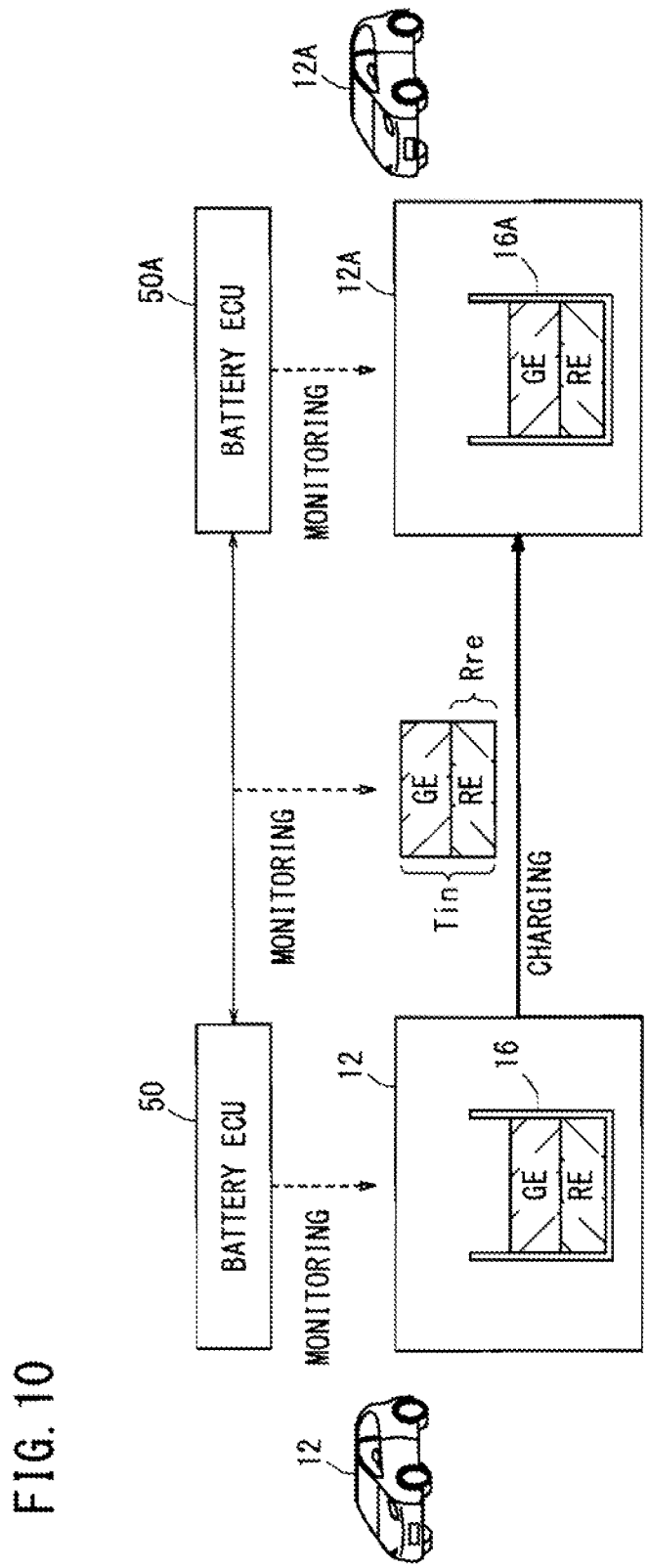
FIG. 10 is a diagram showing the management of a remaining amount of renewable energy at the time the electrically driven vehicle charges another vehicle with renewable energy.

FIG. 10 is a diagram showing the management of a remaining amount of renewable energy at the time the vehicle 12 charges the other vehicle 12A with renewable energy.

As shown in FIG. 8, the charging site ECU 24 manages or monitors the amount of renewable energy and the amount of system energy in the stationary electric storage device 26, manages or monitors the amount of renewable energy RE generated by the solar cell panel 18, and manages or monitors the discharging or supply of renewable energy RE to the vehicle 12. If the charging site 14 is free of the stationary electric storage device 26 and has the virtual electric storage device 27 instead, the charging site ECU 24 may manage only the retained energy of renewable energy RE in the virtual electric storage device 27.

The charging site ECU 24 and the battery ECU 50 cooperate with each other in monitoring shifting of renewable energy RE upon charging the vehicle 12. Specifically, the charging site ECU 24 monitors the total amount Tin of charged electric energy, which represents a total amount of shifted energy, and the renewable energy ratio Rout, thereby monitoring the shifted amounts of renewable energy RE and system energy GE, and manages how much renewable energy RE is charged into the vehicle 12.

The battery ECU 50 manages renewable energy RE that is charged into the vehicle-mounted electric storage device 16 and renewable energy RE that is consumed by the vehicle 12 through running or the like, thus managing the remaining amount SOC, the remaining amount SOCre of renewable energy, the renewable energy ratio Rre, and the regenerative mode of the vehicle 12.

As shown in FIG. 9, the battery ECU 50 manages an amount of renewable energy RE that is consumed by the vehicle 12 through running or the like and an amount of renewable energy GE that is saved in the external electric storage site 100 (120), thus managing the remaining amount SOC, the remaining amount SOCre of renewable energy, and the renewable energy ratio Rre of the vehicle 12.

The battery ECU 50 and the electric storage site ECU 104 (124) cooperate with each other in monitoring shifting of renewable energy RE as it is saved. Specifically, the battery ECU 50 and the electric storage site ECU 104 (124) manage the total amount Tin of charged electric energy (total amount of shifting) which is measured by the electric storage site ECU 104 (124) and the renewable energy ratio Rre of the vehicle 12, thus managing how much renewable energy RE has been charged or saved in the virtual electric storage device 102 or the stationary electric storage device 122. The electric storage site ECU 124 manages the renewable energy RE corresponding to the mount of electric energy generated by the generating device 125 separately from the renewable energy RE that is saved.

As shown in FIG. 10, the battery ECU 50 and a battery ECU 50A manage or monitor the amounts of renewable energy and the amounts of system energy in the vehicle-mounted electric storage device 16, 16A, respectively, manage or monitor the amount of renewable energy RE as it is charged into and discharged from the vehicle 12A. A charging cable with plugs on its both ends is connected between the charging port 44 of the vehicle 12 and a charging port 44A of the vehicle 12A.

The battery ECU 50 and the battery ECU 50A cooperate with each other in monitoring shifting of renewable energy RE upon charging the vehicles 12, 12A. Specifically, the battery ECU 50 and the battery ECU 50A monitor the total amount Tin of charged electric energy, which represents a total amount of shifted energy, and the renewable energy ratio Rout, thereby monitoring the shifted amounts of renewable energy RE and system energy GE, and manages how much renewable energy RE is charged into the vehicle 12.

The battery ECU 50A manages renewable energy RE that is charged into the vehicle-mounted electric storage device 16A and renewable energy RE that is consumed by the vehicle 12A through running, thus managing the remaining amount SOC, the remaining amount SOCre of renewable energy, the renewable energy ratio Rre, and the regenerative mode of the vehicle 12A.

In FIGS. 8 through 10, the server 64 may perform a cooperative managing process by reading data from the vehicles 12, 12A, the charging site 14, and the external electric storage site 100 (120) in synchronism with connection and disconnection between the charging plug 38 and the charging port 44.

[IV. Example of Management of Renewable Energy RE Based on Timing Chart]

Figure 11:
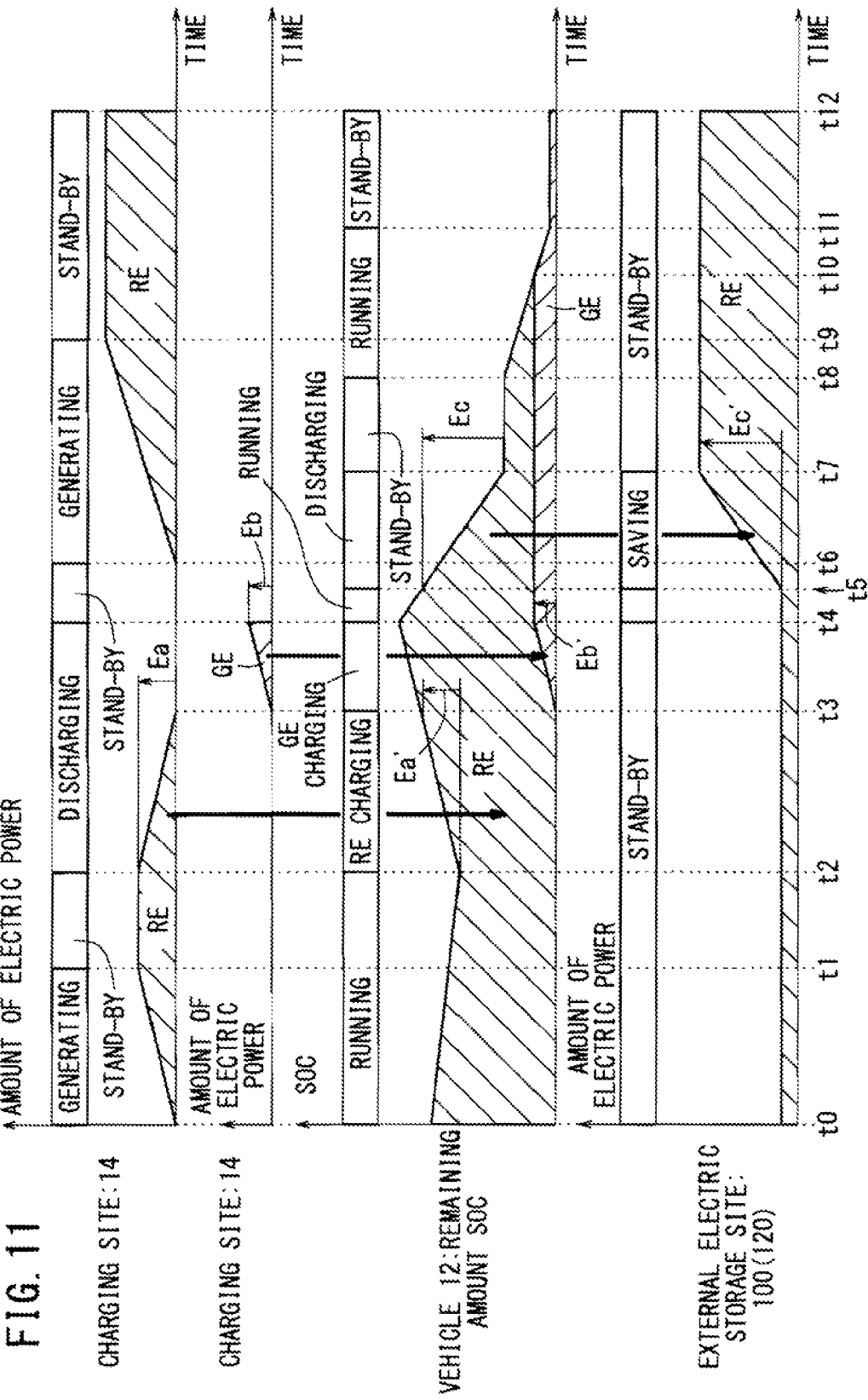
FIG. 11 is a timing chart illustrative of an example of the management of renewable energy.

FIG. 11 is a timing chart illustrative of a sequence wherein the vehicle 12 runs (from time t0 to time t2), then is charged at the charging site 14 (from time t2 to time t4), then runs again (form time t4 to time t5), thereafter saves electric energy in the external electric storage site 100 (120) (from time t5 to time t7), then runs again (from time t8 to t11), after which the vehicle 12 stands by.

In FIG. 11, the horizontal axis represents time, the lowest vertical axis represents the amount of renewable energy (amount of electric power, amount of energy) saved in the external electric storage site 100 (120), the second lowest vertical axis represents the remaining amount SOC in the vehicle-mounted electric storage device 16, the third lowest vertical axis represents the amount of system energy GE (amount of electric power, amount of energy) charged at the charging site 14, and the uppermost vertical axis represents the amount of renewable energy RE (amount of electric power, amount of energy) generated by the solar cell panel 18 at the charging site 14.

From time t0 to time t2, since the vehicle 12 is running, the remaining amount SOC of renewable energy RE in the vehicle-mounted electric storage device 16 decreases as energy is consumed by the running vehicle 12.

From time t0 to time t1, during the daytime, the amount of renewable energy RE generated by the solar cell panel 18 continuously increases up to an amount Ea at the generation ending time t1. From time t0 to time t1, the generated renewable energy RE is stored in the stationary electric storage device 26 or virtually in the virtual electric storage device 27, so that the remaining amount of renewable energy RE in the stationary electric storage device 26 or the virtual electric storage device 27 increases up to the amount Ea.

At time t2, the vehicle 12 travels back to the charging site 14. From time t2 though time t4, the vehicle-mounted electric storage device 16 is charged (supplied with electric energy).

From time t2 to t3, the remaining amount Ea of renewable energy RE stored in the stationary electric storage device 26 or the virtual electric storage device 27 is all charged into the vehicle-mounted electric storage device 16. Actually, a charged amount Ea' (Ea'<Ea) in view of a loss which the energy suffers when shifted is added to the remaining amount SOC in the vehicle 12.

From time t3 to time t4, a required amount Eb of system energy GE from the system energy source 32 is charged into the vehicle-mounted electric storage device 16. Actually, a charged amount Eb' (Eb'<Eb) in view of a loss which the energy suffers when shifted is added to the remaining amount SOC in the vehicle 12. From time t4 though t5, the vehicle 12 runs. From time t5 to t7, an amount Ec of renewable energy is saved from the vehicle 12 in the virtual electric storage device 102 of the external electric storage site 100 or the stationary electric storage device 122 of the external electric storage site 120. Actually, a charged amount Ec' (Ec'<Ec) in view of a loss which the energy suffers when shifted is saved.

From time t8, the vehicle 12 starts to run. At time t10, the vehicle 12 changes from running under renewable energy RE to running under system energy GE.

[V. Full Management of Renewable Energy RE Based on Flowcharts]

Figure 12:
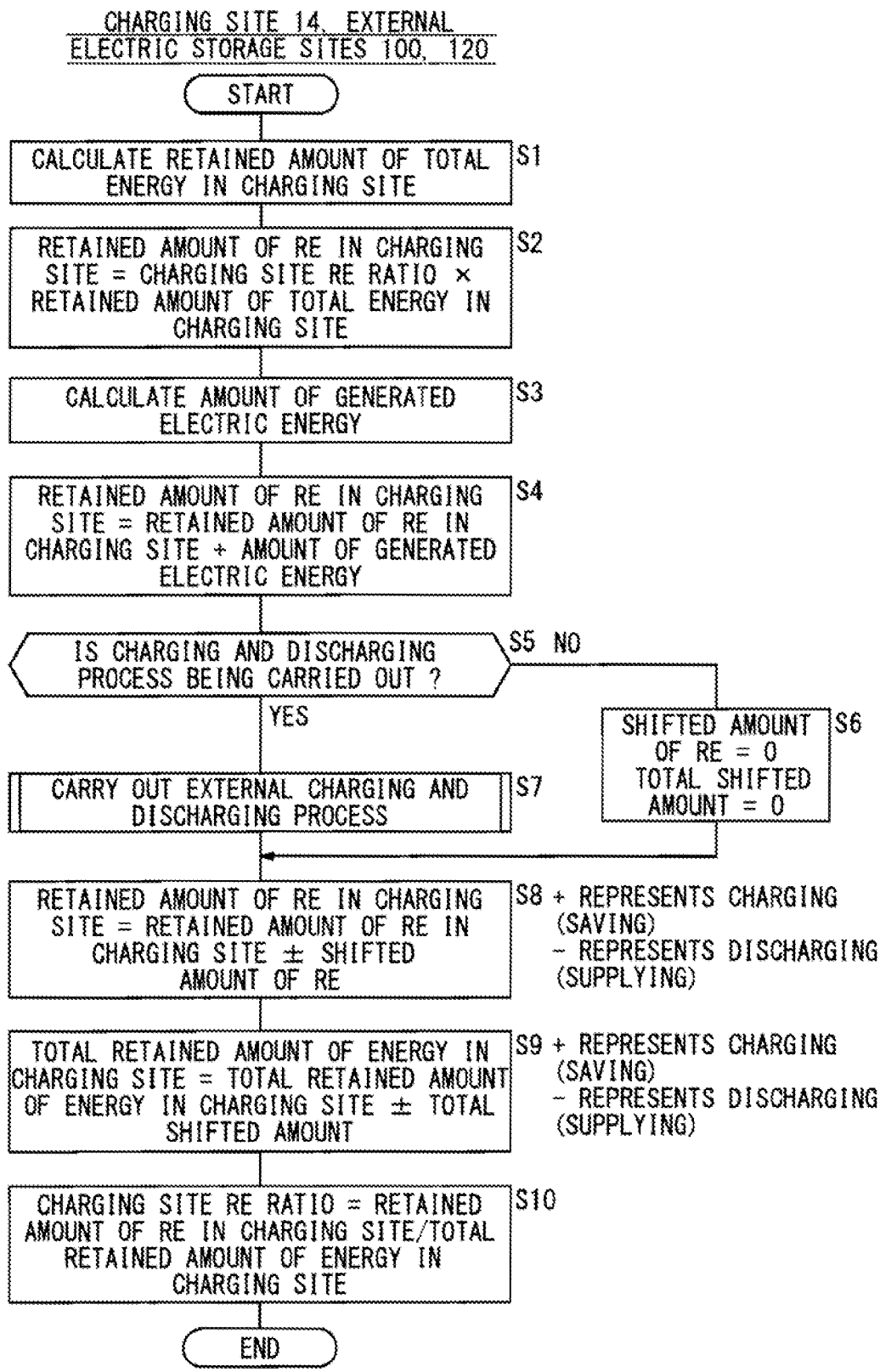
FIG. 12 is a flowchart of an overall sequence of the management of renewable energy.

FIG. 12 is a flowchart of an overall sequence of the management of renewable energy RE at the charging site 14, which is carried out by the charging site ECU 24.

The flowchart shown in FIG. 12 is also applicable to the electric storage site ECUs 104, 124 of the respective external electric storage sites 100, 120.

In step S1 shown in FIG. 12, a total charging-site retained amount of energy (remaining amount) retained in the stationary electric storage device 26 is calculated using a temperature and a voltage as parameters, according to a known procedure.

In step S2, the calculated total charging-site retained amount of energy is multiplied by a present charging-site renewable energy ratio (charging-site RE ratio), thereby calculating a charging-site retained amount of renewable energy (retained amount of RE in charging site: remaining amount).

In step S3, an amount of electric energy generated by the solar cell panel 18 is calculated (measured). In the present embodiment, the generated amount of electric energy which is exclusive of an amount of reverse-flow electric energy supplied to the system energy source 32, but is not exclusive of generated electric energy consumed at the charging site 14, is calculated so as to be saved in the stationary electric storage device 26 or the virtual electric storage device 27. However, the generated amount of electric energy which is exclusive of an amount of reverse-flow electric energy supplied to the system energy source 32 and generated electric energy consumed at the charging site 14 may be calculated. Alternatively, the generated amount of electric energy which is inclusive of an amount of reverse-flow electric energy supplied to the system energy source 32 and generated electric energy consumed at the charging site 14 may be calculated. Any of these calculating options may be selected through the operating unit 28.

The amount of electric energy calculated in step S3 is added to the retained amount of RE in the charging site calculated in step S2, thereby calculating an updated retained amount of RE in the charging site in step S4.

In step S5, it is judged whether a charging and discharging process is being carried out or not. A discharging process is a process of discharging electric energy (supplying electric energy) from the charging site 14, the external electric storage site 100, or the external electric storage site 120 into the vehicle-mounted electric storage device 16 of the vehicle 12, and a charging process is a process of charging electric energy (saving electric energy) from the vehicle-mounted electric storage device 16 of the vehicle 12 into the external electric storage site 100 or the external electric storage site 120. If a charging/discharging process (supplying or saving process) is not being carried out, then an amount of shifted renewable energy (shifted amount of RE) and a total shifted amount are set to zero in step S6.

If a charging and discharging process (supplying and saving process) is being carried out in step S5, then an external charging and discharging process (external supplying and saving process) is carried out in step S7 as described in detail later.

In step S8, the shifted amount of RE calculated in step S6 or step S7 is added to or subtracted from the charging-site retained amount of RE calculated in step S4, thereby calculating an updated charging-site retained amount of RE. If the charging process (saving process) is carried out, then the shifted amount of RE is added. If the discharging process (supplying process) is carried out, then the shifted amount of RE is subtracted.

In step S9, the total shifted amount calculated in step S6 or step S7 is added to or subtracted from the total charging-site retained amount of energy calculated in step S1, thereby calculating an updated total charging-site retained amount of energy. If the charging process (saving process) is carried out, then the total shifted amount is added. If the discharging process (supplying process) is carried out, then the total shifted amount is subtracted.

In step S10, the charging-site RE retained amount calculated in step S8 is divided by the total charging-site retained amount of energy calculated in step S9, thereby calculating a charging-site renewable energy ratio (charging-site RE ratio).

Figure 13:
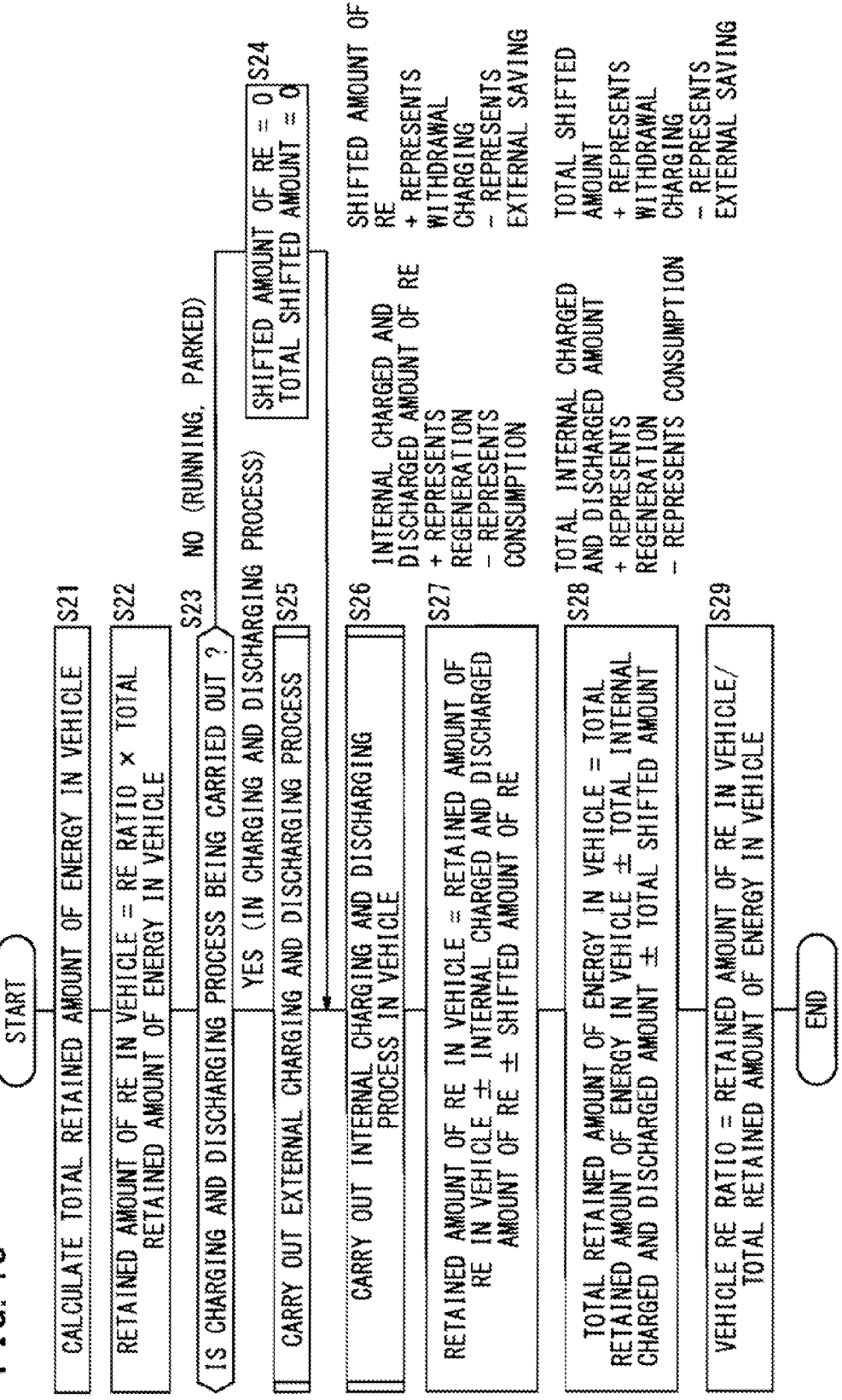
FIG. 13 is a flowchart of a process of managing renewable energy on the electrically driven vehicle.

FIG. 13 is a flowchart of a process of managing renewable energy RE on the electrically driven vehicle 12, which is carried out by the battery ECU 50.

In step S21 shown in FIG. 13, a total vehicle retained amount of energy (remaining amount SOC) retained in the vehicle-mounted electric storage device 16 is calculated using a temperature and a voltage as parameters, according to a known procedure.

In step S22, the calculated total vehicle retained amount of energy (remaining amount SOC) is multiplied by a present renewable energy ratio (RE ratio Rre), thereby calculating a vehicle retained amount of renewable energy (remaining amount SOCre of renewable energy).

In step S23, it is judged whether the vehicle 12 is charging and discharging (is shifting energy to and from) the charging site 14, the external electric storage site 100 or 120, or the other vehicle 12A or not.

If the vehicle 12 is not charging or discharging the charging site 14, the external electric storage site 100 or 120, or the other vehicle 12A, i.e., is running or being parked, then an amount of shifted renewable energy (shifted amount of RE) and a total shifted amount are set to zero in step S24.

If the vehicle 12 is charging or discharging the charging site 14, the external electric storage site 100 or 120, or the other vehicle 12A, i.e., is saving electric energy or charging electric energy by way of withdrawal charging, in step S23, then an external charging and discharging process (external saving and withdrawal charging process) is carried out in step S25 as described in detail later.

After step S24 or step S25, a charging and discharging process in the vehicle 12, which is also referred to as a discharging and consuming process on the vehicle-mounted electric storage device 16 in the power mode and a charging process on the vehicle-mounted electric storage device 16 in the generative mode, or a consuming and regenerating process, is carried out in step S26.

In step S27, an internal charged and discharged amount of RE (consumed or regenerated amount) and the shifted amount of RE (external saved amount/withdrawal charged amount) calculated in step S24, step S25, or step S26 are added to or subtracted from the vehicle retained amount of RE (remaining amount SOCre of renewable energy) calculated in step S22, thereby calculating an updated vehicle retained amount of RE (remaining amount SOCre of renewable energy). If the internal charged and discharged amount of RE is generated by regeneration, then it is added. If the internal charged and discharged amount of RE is generated by consumption, then it is subtracted. If the charging process (external withdrawal charging process) is carried out, then the shifted amount of RE is added. If the discharging process (external saving process) is carried out, then the shifted amount of RE is subtracted.

In step S28, a total internal charged and discharged amount (consumed or regenerated amount) and a total shifted amount (external saved and withdrawal charged amount) calculated in step S24, step S25, or step S26 are added to or subtracted from the total vehicle retained amount of energy (remaining amount SOC) calculated in step S21, thereby calculating an updated total vehicle retained amount of energy (remaining amount SOC). If the total internal charged and discharged amount is caused by regeneration, then it is added. If the total internal charged and discharged amount is caused by consumption, then it is subtracted. If the charging process (external withdrawal charging process) is carried out, then the total shifted amount is added. If the discharging process (external saving process) is carried out, then the total shifted amount is subtracted.

In step S29, the vehicle retained amount of RE (remaining amount SOCre of renewable energy) calculated in step S27 is divided by the total vehicle retained amount of energy (remaining amount SOC) calculated in step S28, thereby calculating a vehicle renewable energy ratio (renewable energy ratio Rre) (Rre=SOCre/SOC).

Figure 14:
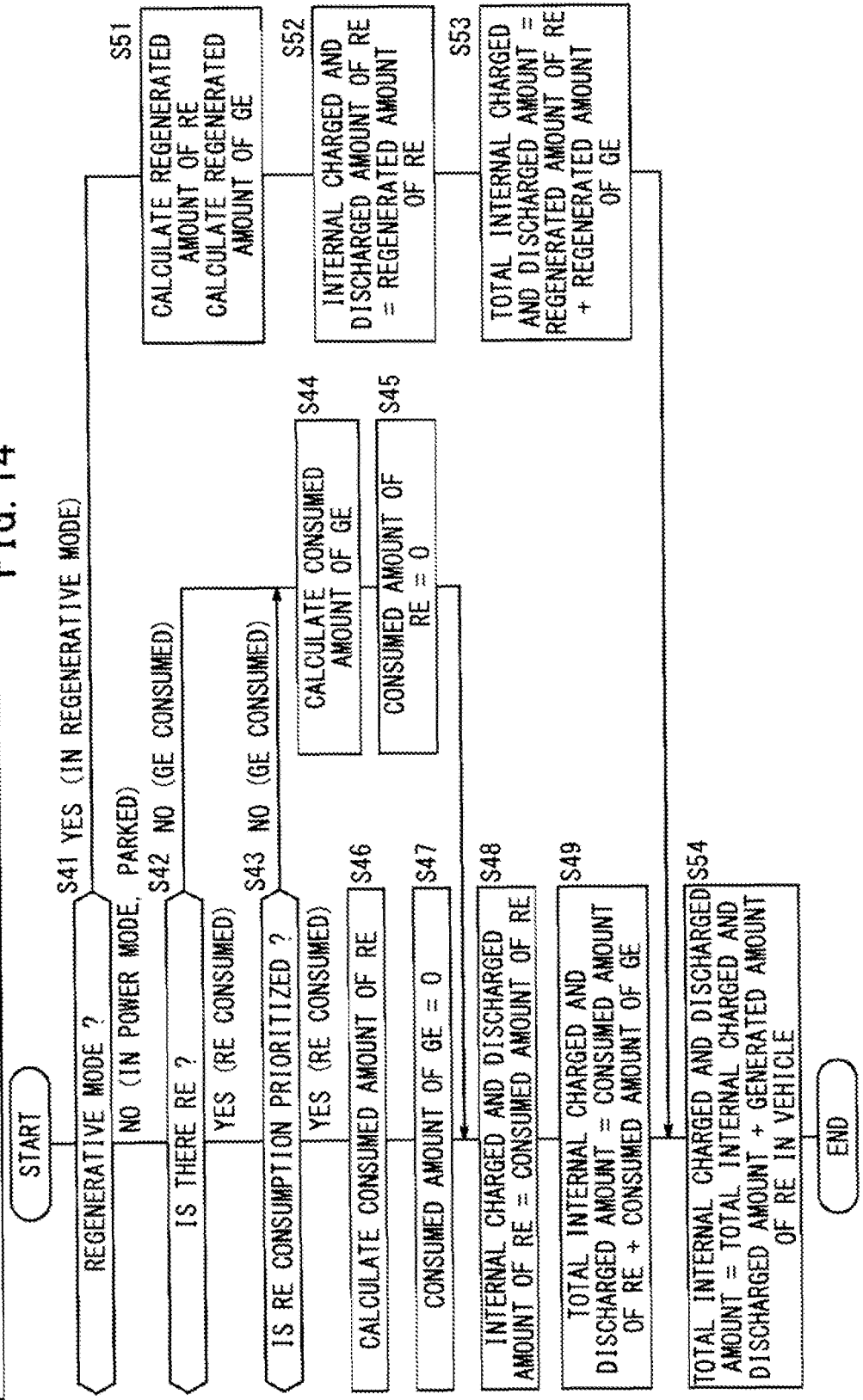
FIG. 14 is a flowchart of an internal vehicular charging and discharging process carried out by the electrically driven vehicle.

FIG. 14 is a flowchart of the internal vehicular charging and discharging process carried out in the electrically driven vehicle 12 by the battery ECU 50 in step S26 in detail.

In step S41 shown in FIG. 14, it is judged whether the vehicle 12 is in the regenerative mode or not.

If the vehicle 12 is not in the regenerative mode (step S41: NO), then electric energy is being consumed when the vehicle 12 is in the power mode or an accessary or auxiliary device in the vehicle 12 is in operation while the vehicle 12 is parked or stopped. In this case, it is judged whether there is any renewable energy RE remaining in the vehicle-mounted electric storage device 16 or not in step S42.

If there is any renewable energy RE remaining in the vehicle-mounted electric storage device 16, then it is judged whether there is set a flag representing prioritized consumption of renewable energy RE or not in step S43.

If there is no renewable energy RE remaining in the vehicle-mounted electric storage device 16 in step S42 or if there is not set a flag representing prioritized consumption of renewable energy RE in step S43, then system energy GE is consumed and an amount of consumed system energy GE is calculated in step S44. In step S45, the amount of consumed renewable energy RE is set to zero.

If there is set a flag representing prioritized consumption of renewable energy RE in step S43, then renewable energy RE is consumed and an amount of consumed renewable energy RE is calculated in step S46. In step S47, the amount of consumed system energy GE is set to zero.

In step S48, the internal charged and discharged amount of RE (consumed or regenerated amount of RE) of the vehicle 12 is set as the amount of consumed renewable energy RE calculated in step S46.

In step S49, a total internal charged and discharged amount (only internal consumed amount) of the vehicle 12 is calculated by adding the amount of consumed system energy GE calculated in step S44 to the amount of consumed renewable energy RE calculated in step S48.

If the vehicle 12 is in the regenerative mode in step S41 (step S41: YES), then in step S51 an amount of regenerated renewable energy RE or an amount of regenerated system energy GE is calculated as described above with reference to FIG. 5. An amount of regenerated electric energy may be calculated entirely as renewable energy RE as described above with reference to FIG. 6.

In step S52, a charged and discharged amount of internal renewable energy RE is set as the amount of regenerated renewable energy RE calculated in step S51.

In step S53, a total internal charged and discharged amount (only a generated amount) is calculated as the sum of the amount of regenerated renewable energy RE and the amount of regenerated system energy GE calculated in step S51.

In step S54, a total internal charged and discharged amount is calculated by adding an amount of electric energy generated by renewable energy generating facilities, not shown, on the vehicle 12 (vehicle generated amount of RE) to the total internal charged and discharged amount (consumed or regenerated amount) calculated in step S49 or step S53.

The external charging and discharging process (external supplying and saving process) which is carried at the charging site 14 and/or the external electric storage sites 100, 120 in step S7 shown in FIG. 12, and the external charging and discharging process (external saving and withdrawal charging process) which is carried out on the vehicle 12 in step S25 shown in FIG. 13 will be described below.

A charged amount of RE in the vehicle-mounted electric storage device 16 can be calculated based on an RE ratio or can be calculated as an absolute amount using a loss.

Figure 15A:
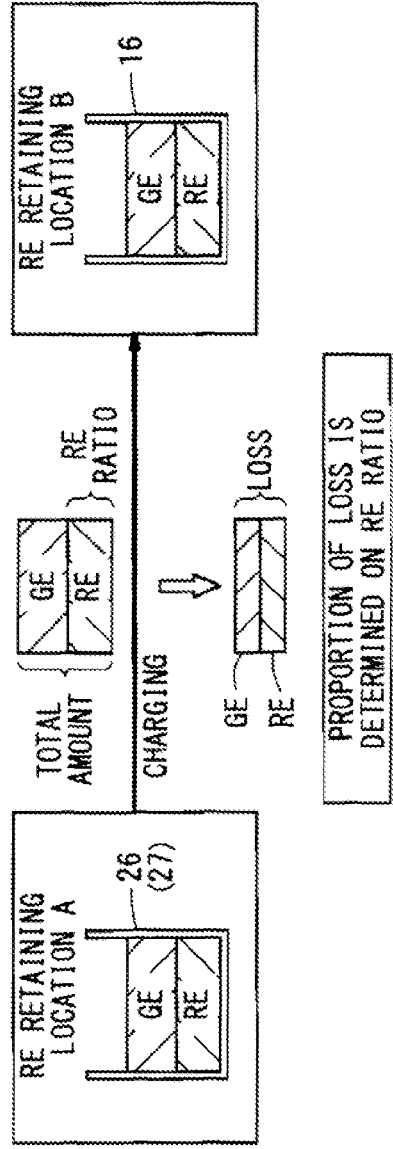
FIG. 15A is a diagram showing how an amount of renewable energy charged into a vehicle-mounted electric storage device installed in the electrically driven vehicle (an amount of stored electric energy) is calculated in terms of a renewable energy ratio.

A charged amount of RE is calculated based on an RE ratio as follows: As shown in FIG. 15A, an RE retaining location A will be described as the charging site 14 and an RE retaining location B as the electrically driven vehicle 12. A total charged amount (total supplied amount) and an RE ratio are transmitted from the RE retaining location A to the RE retaining location B. The RE retaining location B measures a total charged amount in the vehicle-mounted electric storage device 16, calculates a provisional charged amount of RE by multiplying the measured total charged amount by the RE ratio, calculates an RE loss by multiplying the difference between the transmitted total charged amount (total supplied amount) and the measured total charged amount by the RE ratio, and calculates a charged amount of RE in the vehicle-mounted electric storage device 16 by subtracting the RE loss from the provisional charged amount of RE.

Figure 15B:
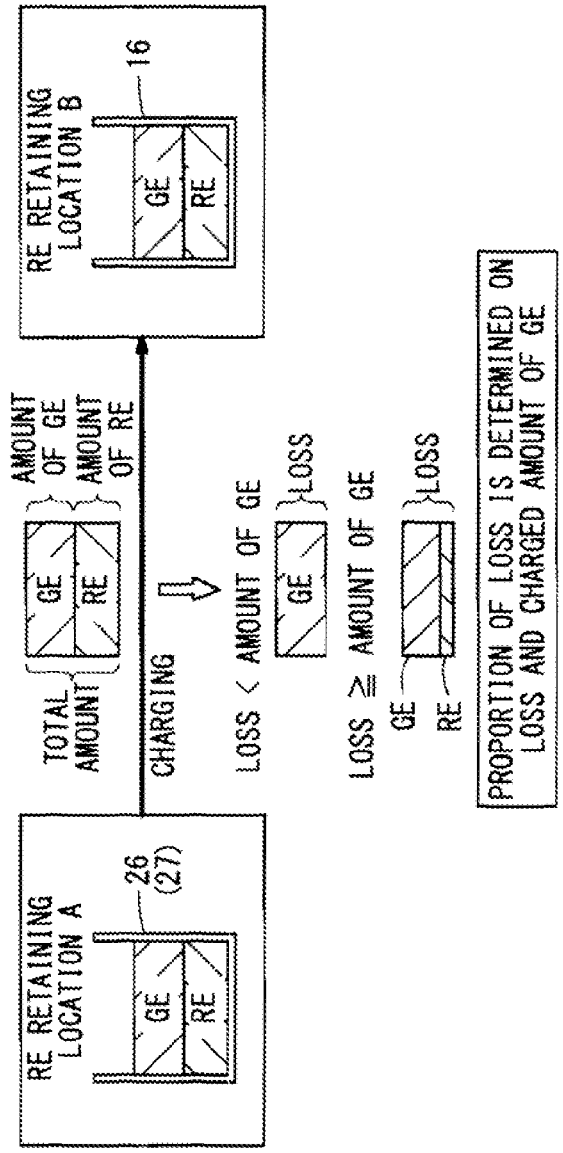
FIG. 15B is a diagram showing how an amount of renewable energy charged into a vehicle-mounted electric storage device installed in the electrically driven vehicle (an amount of stored electric energy) is calculated in terms of an absolute amount using an amount of loss.

Charged Amount of RE=provisional charged amount of RE−RE loss=total supplied amount×RE ratio−(total supplied amount−measured total charged amount)×RE ratio A charged amount of RE is calculated as an absolute amount using a loss as follows: As shown in FIG. 15B, a supplied amount of RE and a supplied amount of GE are transmitted from the RE retaining location A to the RE retaining location B. The RE retaining location B measures a total charged amount in the vehicle-mounted electric storage device 16. In this case, the equation: the amount of RE+the amount of GE−the total amount=a loss is satisfied.

If the loss is smaller than the amount of GE (the loss<the amount of GE), then the loss is all regarded as GE, i.e., the loss is covered with GE. Therefore, if the loss is smaller than the amount of GE, the charged amount of RE becomes the transmitted amount of RE (the charged Amount of RE=the transmitted amount of RE).

If the loss is equal to or greater than the amount of GE (the loss≥the amount of GE), then the charged amount of RE is calculated according to the equation: the charged amount of RE=the transmitted amount of RE−(the loss−the amount of GE). The loss is covered with GE. If GE is insufficient, then the insufficiency of GE is covered with RE.

The process of calculating a charged amount of RE in the vehicle-mounted electric storage device 16 based on an RE ratio will be described in greater detail below with reference to a flowchart shown in FIG. 16.

Figure 16:
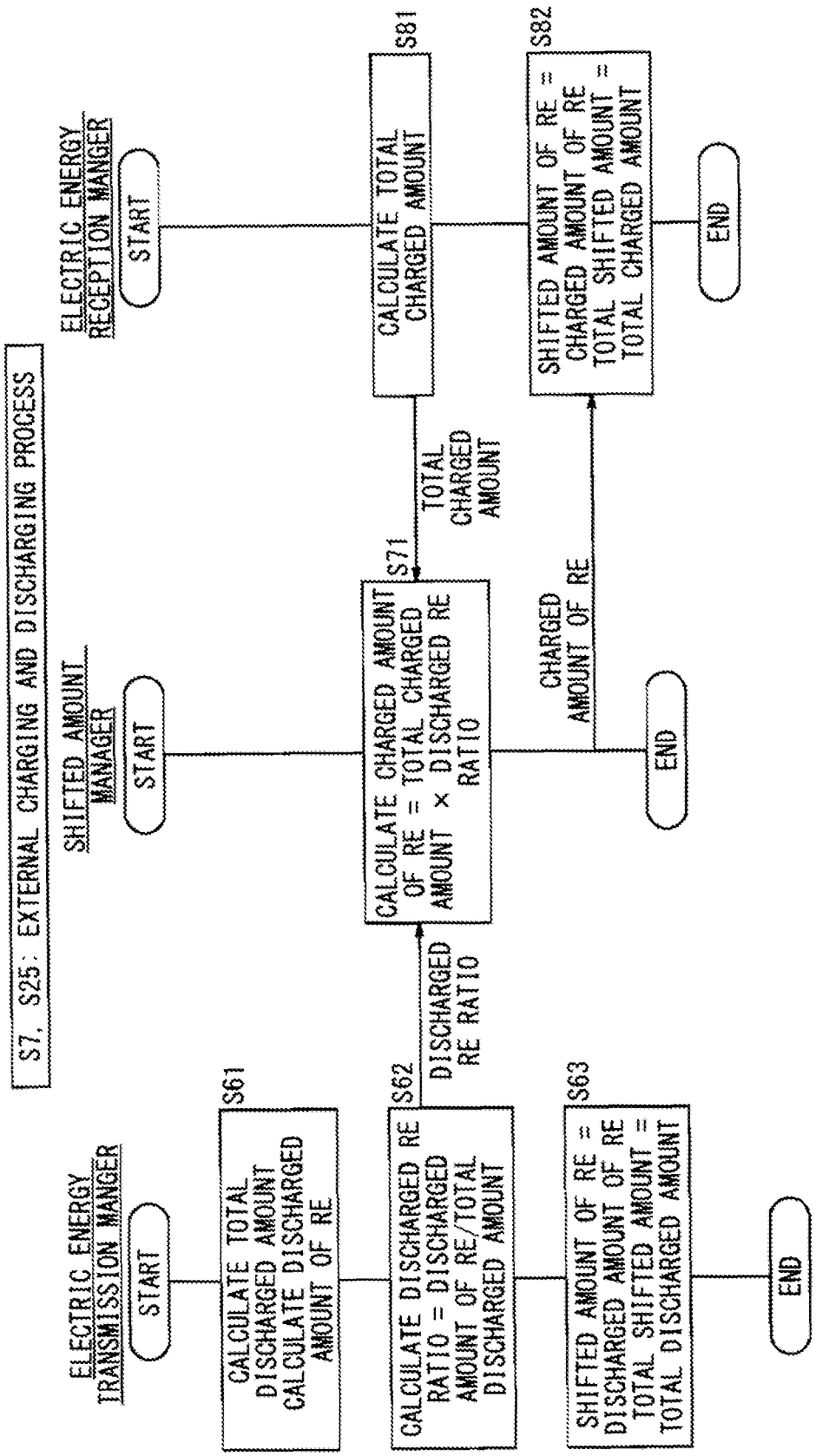
FIG. 16 is a flowchart of an external charging and discharging process using a renewable energy ratio.

The flowchart shown in FIG. 16 illustrates in detail the external charging and discharging process (external supplying and saving process) that is carried out at the charging site 14 and/or the external electric storage sites 100, 120 in step S7 shown in FIG. 12 and the external charging and discharging process (external saving and withdrawal charging process) that is carried out on the electrically driven vehicle 12 in step S25 shown in FIG. 13. FIG. 16 corresponds to the process shown in FIG. 15A.

Steps S61, S62, S63 are executed by the charging site ECU 24, the battery ECU 50, the electric storage site ECU 104 (124), or the server 64 which functions as an electric energy transmission manager when necessary.

Steps S81, S82 are executed by the battery ECU 50, the battery ECU 50A of the vehicle 12A, the electric storage site ECU 104 (124), the charging site ECU 24, or the server 64 which functions as an electric energy reception manager when necessary.

Step S71 is executed by the server 64, the battery ECU 50, or the charging site ECU 24, which functions as a shifted amount manager that is provided by the electric energy transmission manager and the electric energy reception manager that cooperate with each other.

In step S61, the electric energy transmission manager calculates a total discharged amount (total supplied amount) and a discharged amount of RE.

For example, if the electric energy transmission manager is the charging site ECU 24 of the charging site 14, then a total discharged amount (total supplied amount) p is calculated by measuring electric power which flows from the solar cell panel 18, the system energy source 32, and the stationary electric storage device 26 (the virtual electric storage device 27) through the cables 19, 33, 34 into the distributor 20, while the distributor 20 is supplying electric energy through the cable 36 to the electrically driven vehicle 12, in view of a loss caused at the charging site 14. The discharged amount of RE (supplied amount of RE) r is calculated by measuring electric power which flows through the cables 19, 34 into the distributor 20, while the distributor 20 is supplying electric energy through the cable 36 to the electrically driven vehicle 12.

The charging site ECU 24 supplies the vehicle 12 with the total discharged amount (total supplied amount) p according to any of the following different processes. According to the first process, the charging site ECU 24 supplies renewable energy RE and then supplies system energy GE in case the renewable energy RE is used up. According to the second process, the charging site ECU 24 supplies renewable energy RE and renewable energy RE in mixture at an existing renewable energy ratio. According to the third process, in case a discharged amount of renewable energy RE discharged to the distributor 20 is small, the charging site ECU 24 reduces a renewable energy ratio, and increases system energy GE accordingly. Either one of the above processes may be employed.

At any rate, the discharged RE ratio (supplied RE ratio) is calculated according to the equation: the discharged amount of RE (the supplied amount of RE)/the total discharged amount (the total supplied amount)=r/p in step S62.

In step S63, the shifted amount of RE in step S8 shown in FIG. 12 is set as the discharged amount r of RE (supplied amount) (the shifted amount of RE=the discharged amount of RE), and the total shifted amount (the total supplied amount) in step S9 is set as the total discharged amount p (the total shifted amount=the total discharged amount).

In step S81, the electric energy reception manager measures a total charged amount (total stored amount) z of electric energy supplied to the vehicle-mounted electric storage device 16, the virtual electric storage device 102, the stationary electric storage device 122, or the stationary electric storage device 26, as an amount of electric power based on a current and a voltage at an input end thereof, e.g., at the cable 42 connected to the vehicle-mounted electric storage device 16.

In step S71, the shifted amount manager calculates a charged amount α of RE by multiplying the total charged amount (total stored amount) z by the discharged RE ratio r/p obtained from the electric energy transmission manager ($\alpha = z \times r/p$).

In step S82, the shifted amount of RE in step S27 shown in FIG. 13 is set as the charged amount α of RE (shifted amount of RE=charged amount of RE), and the total shifted amount in step S28 is set as the total charged amount (total stored amount) z {the total shifted amount=the total charged amount (total stored amount)}.

The process of calculating a charged amount of RE in the vehicle-mounted electric storage device 16 based on a loss will be described in greater detail below with reference to a flowchart shown in FIG. 17.

Figure 17:
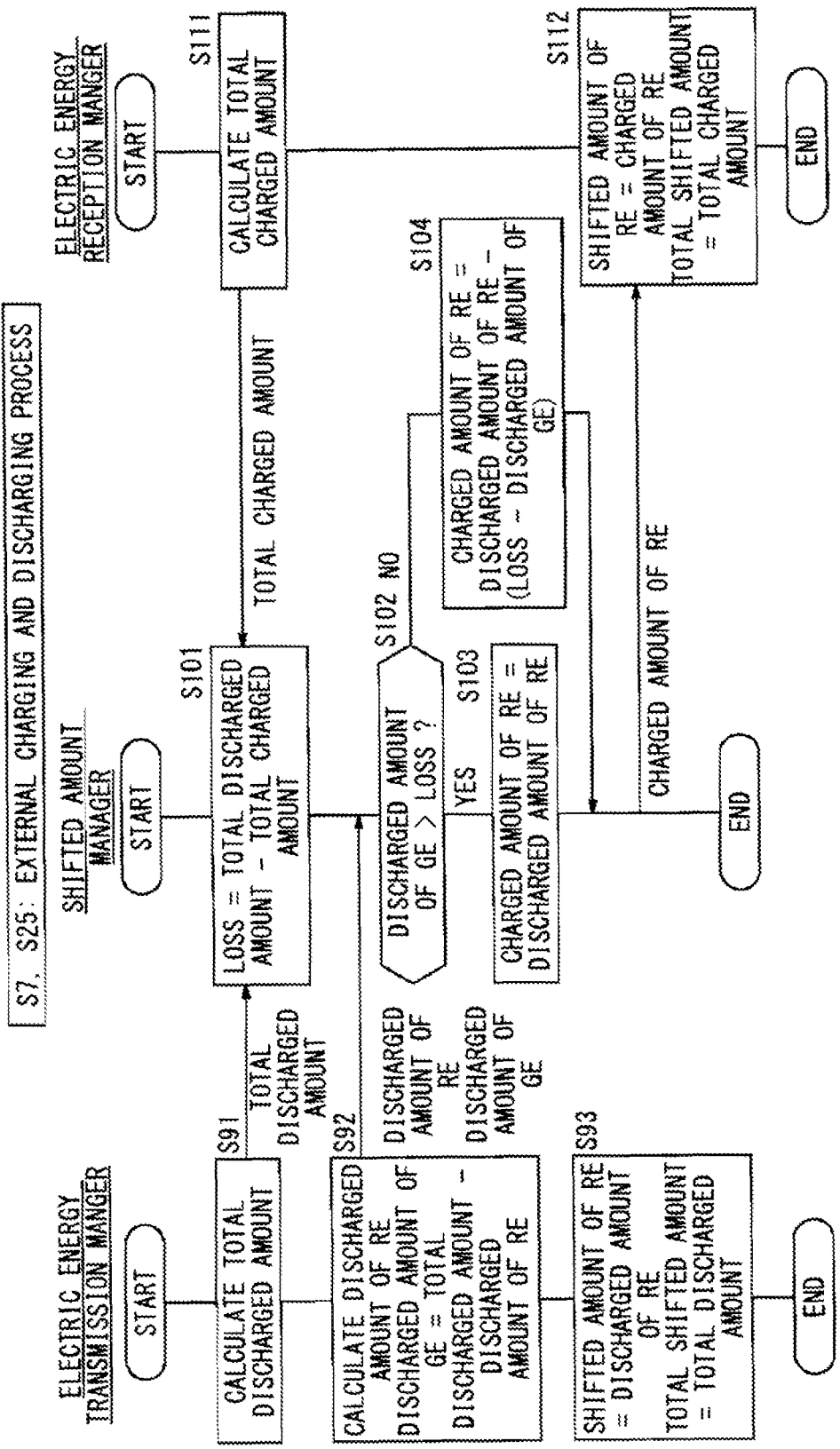
FIG. 17 is a flowchart of an external charging and discharging process using an amount of loss.

The flowchart shown in FIG. 17 illustrates in detail the external charging and discharging process (external supplying and saving process) that is carried out at the charging site 14 and/or the external electric storage sites 100, 120 in step S7 shown in FIG. 12 and the external charging and discharging process (external saving and withdrawal charging process) that is carried out on the electrically driven vehicle 12 in step S25 shown in FIG. 13. FIG. 17 corresponds to the process shown in FIG. 15B.

In step S91, the electric energy transmission manager calculates a total discharged amount (total supplied amount) p and transmits the calculated total discharged amount p to the shifted amount manager. In step S111, the electric energy reception manager calculates a total charged amount (total stored amount) and transmits the calculated total charged amount to the shifted amount manager. In step S101, the shifted amount manager calculates a loss according to the equation: a loss=the total discharged amount−the total charged amount.

In step S92, the electric energy transmission manager calculates a discharged amount of RE and also calculates a discharged amount of GE according to the equation: a discharged amount of GE=the total discharged amount−the discharged amount of RE. The electric energy transmission manager transmits the discharged amount of RE and the discharged amount of GE to the shifted amount manager (external discharge processor).

In step S93, the electric energy transmission manager manages the shifted amount of RE as the discharged amount of RE, and also manages the total shifted amount as the total discharged amount.

In step S102, the shifted amount manager (external discharge processor) judges whether the discharged amount of GE is greater than the loss or not. If the discharged amount of GE is greater than the loss (step S102: YES), then the shifted amount manager manages the charged amount of RE (the stored amount of RE) as the discharged amount of RE in step S103. If the loss is greater than the discharged amount of GE (step S102: NO), then the shifted amount manager manages the charged amount of RE (the stored amount of RE) as a value produced by subtracting (the loss−the discharged amount of GE) from the discharged amount of RE {the charged amount of RE=the discharged amount of RE−(the loss−the discharged amount of GE)} in step S104.

The charged amount of RE (the stored amount of RE) that is calculated in step S103 or step S104 is transmitted to the electric energy reception manager.

In step S112, the electric energy reception manager manages the shifted amount of RE as the charged amount of RE (the stored amount of RE) (the shifted amount of RE=the charged amount of RE), and also manages the total shifted amount as the total charged amount (the total stored amount) (the total shifted amount=the total charged amount).

Figure 18:
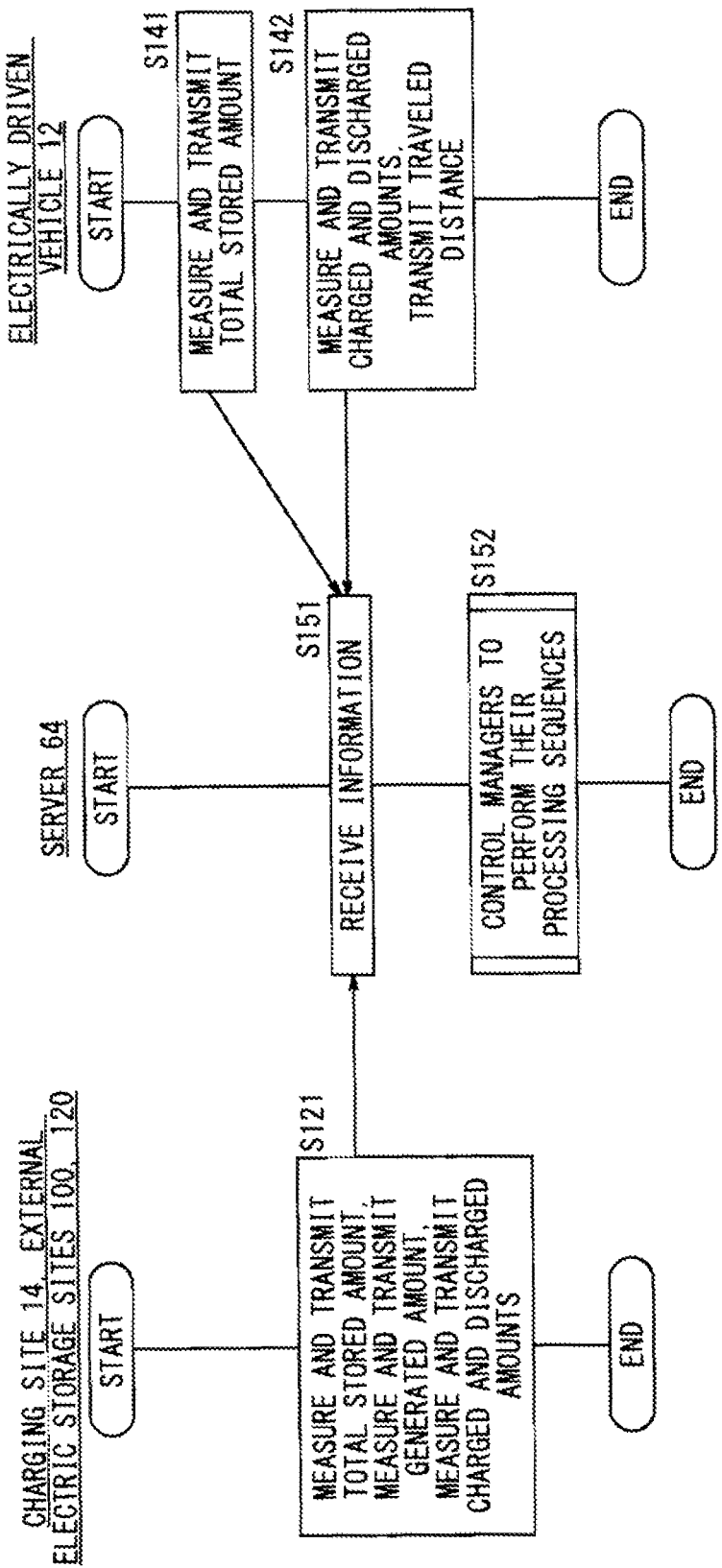
FIG. 18 is a flowchart of a sequence in which manager processes are carried out by a server.

The processing sequences, shown in FIGS. 16 and 17, of the electric energy transmission manager, the shifted amount manager, and the electric energy reception manager can also be carried out by the server 64 as shown in FIG. 18.

As shown in FIG. 18, in step S121, the charging site 14 and the external electric storage sites 100, 120 transmit total stored amounts (stored amounts in the stationary electric storage devices 26, 122 and the virtual electric storage devices 27, 102), generated amounts (generated amounts from the solar cell panel 18 and the generating device 125), and charged and discharged amounts (saved amounts and supplied amounts) to the server 64 each time they measure those amounts. In step S141, the electrically driven vehicle 12 measures a total stored amount and transmits the measured total stored amount to the server 64. In step S142, the electrically driven vehicle 12 measures charged and discharged amounts (consumed amounts, saved amounts, and withdrawal charged amounts), measures a traveled distance, and transmits the measured amounts and traveled distance to the server 64. The user may manually operate the operating unit 52 to transmit the traveled distance to the server 64.

In step S151, the server 64 receives the transmitted information. In step S152, the server 64 carries out the processing sequences of the electric energy transmission manager, the shifted amount manager, and the electric energy reception manager shown in FIGS. 16 and 17, and transmit the processed results to the charging site 14, the external electric storage sites 100, 120, and the electrically driven vehicle 12.

SUMMARY OF EMBODIMENTS

As described above, the vehicle running management system 10 under renewable energy according to the embodiments of the present invention includes the charging site 14, having the solar cell panel 18 as an electric generator, which is supplied with renewable energy RE from the solar cell panel 18 and system energy GE from the system energy source 32, the charging site ECU 24 as a charging site manager for managing an amount of renewable energy in the charging site 14, the electrically driven vehicle 12 having the vehicle-mounted electric storage device 16 which is charged with renewable energy RE and system energy GE that are sent from the charging site 14 when the vehicle-mounted electric storage device 16 is electrically connected to the charging site 14, and the battery ECU 50 as a vehicle manager for managing an amount of renewable energy stored in the vehicle-mounted electric storage device 16 of the electrically driven vehicle 12.

The battery ECU 50 manages a remaining amount of renewable energy stored in the vehicle-mounted electric storage device 16 as it increases and decreases when renewable energy RE is charged into the vehicle-mounted electric storage device 16 and renewable energy RE is discharged from the vehicle-mounted electric storage device 16. The charged and discharged amount of renewable energy RE in the electrically driven vehicle 12 can thus be managed, and the management of the amount of renewable energy is clarified in the relationship between the electrically driven vehicle 12 and the charging site 14.

The vehicle manager may be present as the battery ECU 50 in the electrically driven vehicle 12, or may be present in the server 64 which is located outside of the electrically driven vehicle 12 and is connected thereto through a communication link for synchronously managing data, or may be present as the charging site ECU 24 in the charging site 14 and is connected thereto through a communication link for synchronously managing data. Similarly, the charging site manager may be present as the charging site ECU 24 in the charging site 14, or may be present in the server 64 which is connected to the charging site 14 through a communication link for synchronously managing data, or may be present in the electrically driven vehicle 12 which is connected to the charging site 14 through a communication link for synchronously managing data.

The charging site 14 has the virtual electric storage device 27, and the charging site ECU 24 stores renewable energy RE generated by the solar cell panel 18 in the virtual electric storage device 27 when the electrically driven vehicle 12 is not charged. Therefore, even if the charging site 14 is free of the stationary electric storage device 26 or when the electrically driven vehicle 12 is running during the daytime and cannot be charged with renewable energy RE from the solar cell panel 18, the electrically driven vehicle 12 can subsequently be charged at the charging site 14 as if with renewable energy RE from the virtual electric storage device 27.

If the charging site 14 is free of the stationary electric storage device 26, then renewable energy RE generated by the solar cell panel 18 is consumed by the charging site 14, and a pseudo-amount of renewable energy RE which is commensurate with the consumed amount of renewable energy RE is stored (memorized) in the virtual electric storage device 27 of the charging site 14. When the electrically driven vehicle 12 is to be charged with the pseudo-amount of renewable energy RE stored in the virtual electric storage device 27, the electrically driven vehicle 12 is actually charged with an amount of system energy GE which corresponds to the pseudo-amount of renewable energy RE stored (memorized) in the virtual electric storage device 27. The amount of system energy can thus be managed as the used amount of renewable energy.

When the charging site ECU 24 transmits electric energy from the charging site 14 to the electrically driven vehicle 12, it also transmits a renewable energy ratio representing the proportion of renewable energy in the transmitted electric energy to the battery ECU 50. The battery ECU 50 measures the total received amount of electric energy, and multiplies the measured total received amount of electric energy by the renewable energy ratio, thereby calculating an increase in the renewable energy RE that is stored in the vehicle-mounted electric storage device 16. Consequently, even if the amount of transmitted electric energy which is measured at a transmission side and the amount of received electric energy which is measured at a reception site do not agree with each other, the reception side can reasonably calculate an increase in the renewable energy RE. Actually, since each of the transmission side, the reception side, and the transmission path therebetween causes a loss, the amount of transmitted electric energy and the amount of received electric energy do not agree with each other.

The battery ECU 50 calculates a loss as the difference between a total discharged amount representing a total transmitted amount of electric energy, which includes renewable energy RE and system energy GE measured at the charging site 14, and a total charged amount in the vehicle-mounted electric storage device 16 which is measured by the battery ECU 50. If the loss is smaller than the amount of system energy transmitted from the charging site 14, then the battery ECU 50 may manage the loss entirely as the amount of system energy. If the loss is greater than the amount of system energy transmitted from the charging site 14, then the battery ECU 50 may cover the loss with the amount of system energy and manage a shortage of the amount of system energy as the amount of renewable energy.

The battery ECU 50 is capable of selecting whether electric energy required to drive the electrically driven vehicle 12 should be renewable energy RE or system energy GE. When regenerated electric energy is charged into the vehicle-mounted electric storage device 16 while the electrically driven vehicle 12 is running, the battery ECU 50 manages an increase in the electric energy which is caused by the regenerated electric energy as an increase in renewable energy RE, so that the user can realize that renewable energy RE is used on the electrically driven vehicle 12.

Furthermore, the battery ECU 50 is capable of selecting whether electric energy required to drive the electrically driven vehicle 12 should be renewable energy RE or system energy GE. When regenerated electric energy is charged into the vehicle-mounted electric storage device 16 while the electrically driven vehicle 12 is running, if renewable energy RE is selected to drive the electrically driven vehicle 12, then the battery ECU 50 manages the energy rise 90 caused by the regenerated electric energy as an increase in renewable energy RE, and if system energy GE is selected to drive the electrically driven vehicle 12, then the battery ECU 50 manages the energy rise 92 caused by the regenerated electric energy as a rise in system energy GE or the rise 93 in renewable energy RE, so that the user can realize that renewable energy RE is used on the electrically driven vehicle 12.

The battery ECU 50 may give the user of the electrically driven vehicle 12 the incentives based on the running of the electrically driven vehicle 12 using renewable energy RE as a propulsive energy source, so that the running of the electrically driven vehicle 12 using renewable energy RE can be promoted.

The battery ECU 50 displays on the display unit 54 a visualized physical quantity representing the running of the electrically driven vehicle 12 using renewable energy RE as a propulsive energy source. Therefore, the use of renewable energy RE is visualized to make the user realize better that renewable energy RE is used on the electrically driven vehicle 12.

The battery ECU 50 displays on the display unit 54 the remaining amount SOC of renewable energy RE stored in the vehicle-mounted electric storage device 16. Therefore, the use of renewable energy RE is visualized to make the user realize better that renewable energy RE is used on the electrically driven vehicle 12.

The incentives are given by the national government or the local governments or their representatives to achieve a higher possibility to contribute to a reduction in the $CO_2$ emissions at the national level.

The present invention is not limited to above embodiments. In the embodiments, for example, electric energy is charged and discharged through contacts provided by the plug 38, 38A, 38B and the charging port 44 which are connected by the cable 36, 36A, 36B. However, electric energy may be charged and discharged through a contactless structure such as a transformer having primary and secondary coils.

Although the preferred embodiments of the present invention have been described above, many changes and modifications may be made to the embodiments based on the disclosure of the present invention without departing from the scope of the appended claims.

What is claimed is:

1. A vehicle running management system under renewable energy comprising:
a charging site, having an electric generator, which is supplied with renewable energy from the electric generator and system energy from a system energy source;
a charging site manager for managing an amount of renewable energy in the charging site;
an electrically driven vehicle having a vehicle-mounted electric storage device which is charged with renewable energy and system energy that are sent from the charging site when the vehicle-mounted electric storage device is electrically connected to the charging site; and
a vehicle manager for managing an amount of renewable energy stored in the vehicle-mounted electric storage device of the electrically driven vehicle;
wherein the vehicle manager manages a remaining amount of renewable energy stored in the vehicle-mounted electric storage device as the remaining amount increases and decreases when renewable energy is charged into the vehicle-mounted electric storage device and renewable energy is discharged from the vehicle-mounted electric storage device, and
wherein the vehicle manager further manages a remaining amount of system energy stored in the vehicle-mounted electric storage device and a total remaining amount of energy stored in the vehicle-mounted electric storage device,
wherein the vehicle manager calculates a loss as a difference between a total discharged amount representing a total transmitted amount of electric energy, which includes renewable energy and system energy measured at the charging site, and a total charged amount in the vehicle-mounted electric storage device which is measured by the vehicle manager, and
if the loss is smaller than the amount of system energy transmitted from the charging site, then the vehicle manager manages the loss entirely as an amount of system energy, and if the loss is greater than the amount of system energy transmitted from the charging site, then the vehicle manager covers the loss with the amount of system energy and manages a shortage of the amount of system energy as the amount of renewable energy.

2. The vehicle running management system according to claim 1, wherein
the charging site includes an electrical load different from an electrical storage as a virtual electric storage device; and
the electrical load consumes renewable energy generated by the electric generator in the virtual electric storage device when the electrically driven vehicle is not charged, and the charging site manager regards an amount of the renewable energy consumed at the electrical load as an amount of renewable energy charged at the virtual electric storage device.

3. The vehicle running management system according to claim 1, wherein
when the charging site manager transmits electric energy from the charging site to the electrically driven vehicle, the charging site manager also transmits a renewable energy ratio representing a proportion of renewable energy in the transmitted electric energy to the vehicle manager; and
the vehicle manager measures a total received amount of electric energy, and multiplies the measured total received amount of electric energy by the renewable energy ratio, thereby calculating an increase in the renewable energy that is stored in the vehicle-mounted electric storage device.

4. The vehicle running management system according to claim 1, wherein
the vehicle manager is configured to select whether electric energy required to drive the electrically driven vehicle should be the renewable energy or the system energy; and
when regenerated electric energy is charged into the vehicle-mounted electric storage device while the electrically driven vehicle is running, the vehicle manager manages an increase in the electric energy which is caused by the regenerated electric energy as an increase in renewable energy.

5. The vehicle running management system according to claim 1, wherein
the vehicle manager is configured to select whether electric energy required to drive the electrically driven vehicle should be renewable energy or system energy; and
when regenerated electric energy is charged into the vehicle-mounted electric storage device while the electrically driven vehicle is running, if renewable energy is selected to drive the electrically driven vehicle, then the vehicle manager manages an energy rise caused by the regenerated electric energy as an increase in renewable energy, and if system energy is selected to drive the electrically driven vehicle, then the vehicle manager manages an energy rise caused by the regenerated electric energy as an increase in system energy.

6. The vehicle running management system according to claim 1, wherein
the vehicle manager gives a user of the electrically driven vehicle an incentive based on running of the electrically driven vehicle using renewable energy as a propulsive energy source.

7. The vehicle running management system according to claim 1, wherein
the electrically driven vehicle includes a display unit; and
the vehicle manager displays on the display unit a visualized physical quantity representing running of the electrically driven vehicle using renewable energy as a propulsive energy source.

8. The vehicle running management system according to claim 1, wherein
the electrically driven vehicle includes a display unit; and
the vehicle manager displays on the display unit a remaining amount of renewable energy stored in the vehicle-mounted electric storage device.

9. A vehicle running management system under renewable energy comprising:
a charging site, having an electric generator, which is supplied with renewable energy from the electric generator and system energy from a system energy source;
a charging site manager for managing an amount of renewable energy in the charging site;
an electrically driven vehicle having a vehicle-mounted electric storage device which is charged with renewable energy and system energy that are sent from the charging site when the vehicle-mounted electric storage device is electrically connected to the charging site; and
a vehicle manager for managing an amount of renewable energy stored in the vehicle-mounted electric storage device of the electrically driven vehicle;
wherein the vehicle manager manages a remaining amount of renewable energy stored in the vehicle-mounted electric storage device as the remaining amount increases and decreases when renewable energy is charged into the vehicle-mounted electric storage device and renewable energy is discharged from the vehicle-mounted electric storage device,
wherein the vehicle manager further manages a remaining amount of system energy stored in the vehicle-mounted electric storage device and a total remaining amount of energy stored in the vehicle-mounted electric storage device,
wherein the vehicle manager is configured to select whether electric energy required to drive the electrically driven vehicle should be the renewable energy or the system energy; and
when regenerated electric energy is charged into the vehicle-mounted electric storage device while the electrically driven vehicle is running, the vehicle manager manages an increase in the electric energy which is caused by the regenerated electric energy as an increase in renewable energy.

10. The vehicle running management system according to claim 9, wherein
the vehicle manager gives a user of the electrically driven vehicle an incentive based on running of the electrically driven vehicle using renewable energy as a propulsive energy source.

11. The vehicle running management system according to claim 9, wherein
the electrically driven vehicle includes a display unit; and
the vehicle manager displays on the display unit a visualized physical quantity representing running of the electrically driven vehicle using renewable energy as a propulsive energy source.

12. The vehicle running management system according to claim 9, wherein
the electrically driven vehicle includes a display unit; and
the vehicle manager displays on the display unit a remaining amount of renewable energy stored in the vehicle-mounted electric storage device.

13. A vehicle running management system under renewable energy comprising:
a charging site, having an electric generator, which is supplied with renewable energy from the electric generator and system energy from a system energy source;
a charging site manager for managing an amount of renewable energy in the charging site;
an electrically driven vehicle having a vehicle-mounted electric storage device which is charged with renewable energy and system energy that are sent from the charging site when the vehicle-mounted electric storage device is electrically connected to the charging site; and a vehicle manager for managing an amount of renewable energy stored in the vehicle-mounted electric storage device of the electrically driven vehicle;

wherein the vehicle manager manages a remaining amount of renewable energy stored in the vehicle-mounted electric storage device as the remaining amount increases and decreases when renewable energy is charged into the vehicle-mounted electric storage device and renewable energy is discharged from the vehicle-mounted electric storage device, and wherein the vehicle manager further manages a remaining amount of system energy stored in the vehicle-mounted electric storage device and a total remaining amount of energy stored in the vehicle-mounted electric storage device, wherein the vehicle manager is configured to select whether electric energy required to drive the electrically driven vehicle should be renewable energy or system energy; and when regenerated electric energy is charged into the vehicle-mounted electric storage device while the electrically driven vehicle is running, if renewable energy is selected to drive the electrically driven vehicle, then the vehicle manager manages an energy rise caused by the regenerated electric energy as an increase in renewable energy, and if system energy is selected to drive the electrically driven vehicle, then the vehicle manager manages an energy rise caused by the regenerated electric energy as an increase in system energy.

14. The vehicle running management system according to claim 13, wherein the vehicle manager gives a user of the electrically driven vehicle an incentive based on running of the electrically driven vehicle using renewable energy as a propulsive energy source.

15. The vehicle running management system according to claim 13, wherein the electrically driven vehicle includes a display unit; and the vehicle manager displays on the display unit a visualized physical quantity representing running of the electrically driven vehicle using renewable energy as a propulsive energy source.

16. The vehicle running management system according to claim 13, wherein the electrically driven vehicle includes a display unit; and the vehicle manager displays on the display unit a remaining amount of renewable energy stored in the vehicle-mounted electric storage device.

\* \* \* \* \*